(12) United States Patent
Zhang et al.

(10) Patent No.: US 11,144,159 B2
(45) Date of Patent: Oct. 12, 2021

(54) DRIVING METHOD OF DISPLAY PANEL, DISPLAY PANEL AND DISPLAY DEVICE

(71) Applicant: Shanghai Tianma AM-OLED Co., Ltd., Shanghai (CN)

(72) Inventors: Mengmeng Zhang, Shanghai (CN); Xingyao Zhou, Shanghai (CN); Yana Gao, Shanghai (CN); Yue Li, Shanghai (CN)

(73) Assignee: Shanghai Tianma AM-OLED Co., Ltd., Shanghai (CN)

( * ) Notice: Subject to any disclaimer, the term of this patent is extended or adjusted under 35 U.S.C. 154(b) by 0 days.

(21) Appl. No.: 17/171,743

(22) Filed: Feb. 9, 2021

(65) Prior Publication Data

US 2021/0165548 A1 Jun. 3, 2021

(30) Foreign Application Priority Data

Nov. 30, 2020 (CN) .......................... 202011380601.1

(51) Int. Cl.
  *G06F 3/041* (2006.01)
  *G09G 3/20* (2006.01)

(52) U.S. Cl.
  CPC .......... *G06F 3/04166* (2019.05); *G09G 3/20* (2013.01); *G09G 2310/0286* (2013.01); *G09G 2310/08* (2013.01)

(58) Field of Classification Search
  CPC .................. G06F 3/04166; G09G 3/20; G09G 2310/0286; G09G 2310/08
  See application file for complete search history.

(56) References Cited

U.S. PATENT DOCUMENTS

| | | | | | |
|---|---|---|---|---|---|
| RE48,678 E | * | 8/2021 | Su | .......................... | G09G 3/2092 |
| 11,088,571 B2 | * | 8/2021 | Choi | ........................ | H02M 3/28 |
| 11,088,767 B2 | * | 8/2021 | Schmid | ................... | G06Q 20/12 |
| 11,089,351 B2 | * | 8/2021 | Yoshizawa | ............ | G06F 3/0487 |

FOREIGN PATENT DOCUMENTS

| | | |
|---|---|---|
| CN | 104199573 B | 5/2017 |
| CN | 104503610 B | 10/2017 |
| CN | 104820520 B | 10/2017 |

\* cited by examiner

*Primary Examiner* — Sejoon Ahn
(74) *Attorney, Agent, or Firm* — Tarolli, Sundheim, Covell & Tummino LLP

(57) ABSTRACT

A driving method of a display panel, a display panel and a display device are provided. The display panel includes M driving signal wires, M pixel-rows, a first driving circuit and a second driving circuit, the first clock signal wire pair for controlling operation of the first driving circuit, and the second clock signal wire pair for controlling operation of the second driving circuit. In the driving method, clock signals with a regular period are respectively provided to the first clock signal wire pair and the second clock signal wire pair, in order to divide a display process of the display panel into multiple display phases and control the display panel to execute a touch phase between two adjacent display phases, to realize time division execution of display and touch.

20 Claims, 18 Drawing Sheets

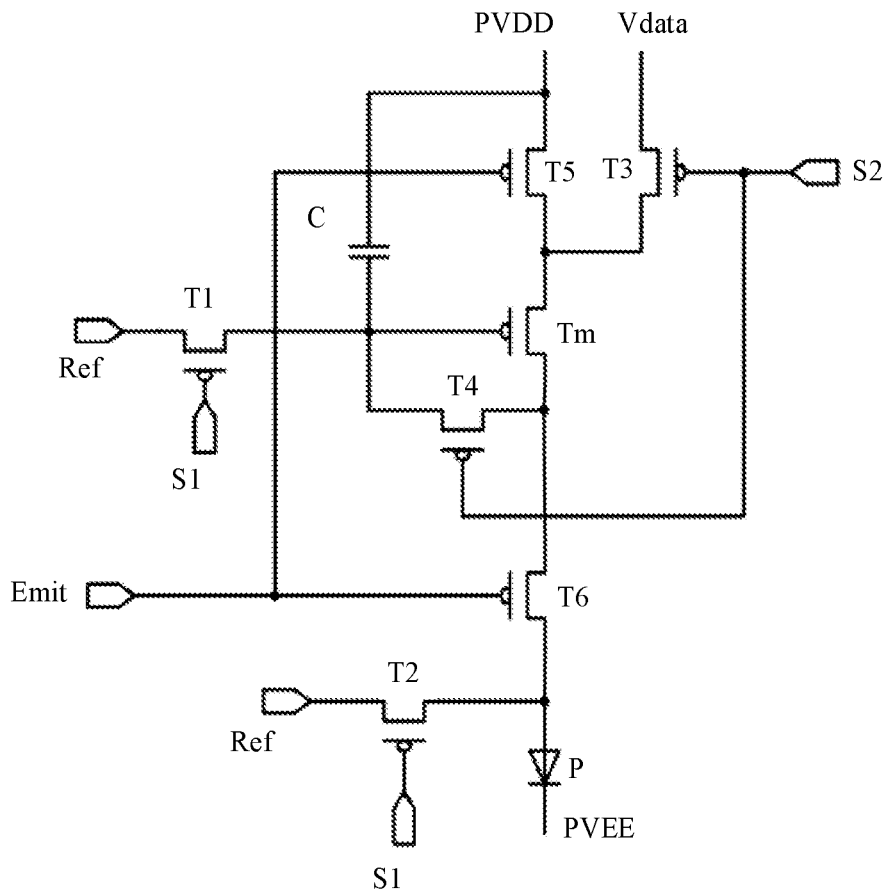

The display phase includes at least one display period; the display period includes at least one first sub-phase and at least one second sub-phase which are alternately executed; in the first sub-phase, the effective clock signal provided by the first clock signal wire pair controls the first driving signal wire to provide a driving signal to the pixel-row; in the second sub-phase, the effective clock signal provided by the second clock signal wire pair controls the second driving signal wire to provide a driving signal to the pixel-row

FIG. 7

DRIVING METHOD OF DISPLAY PANEL, DISPLAY PANEL AND DISPLAY DEVICE

CROSS-REFERENCE TO RELATED APPLICATIONS

The present application claims priority to Chinese Patent Application No. 202011380601.1, filed on Nov. 30, 2020, the content of which is incorporated herein by reference in its entirety.

TECHNICAL FIELD

The present disclosure relates to the field of display technology, and more particularly, to a driving method of a display panel, a display panel, and a display device.

BACKGROUND

With the development of display technology, touch functions are usually integrated in current display panels. Since a touch electrode is relatively close to a display electrode, potential changes on the display electrode will interfere with signals on the touch electrode, which may affect a touch performance. In order to reduce interference of display to touch signals, touch and display are usually set to be performed in a time-sharing manner. This setting requires clock signal wires to provide clock signals with an unconventional waveform, and requires a driver chip to provide a special support, which increases requirements for the driver chip.

SUMMARY

A driving method of a display panel, a display panel and a display device are provided according to embodiments of the present disclosure, which realizes time division execution of touch and display in the case that the clock signal wires provide clock signals with a regular periodic waveform, thereby reducing the requirements on the driver chip.

In a first aspect, a driving method of a display panel is provided according to an embodiment of the present disclosure. The display panel includes:

M pixel-rows arranged in a first direction, where M is a positive integer;

a first driving circuit and a second driving circuit, where the first driving circuit includes a plurality of first shift registers in cascade, and the second driving circuit includes a plurality of second shift registers in cascade;

M driving signal wires, where each one of the M driving signal wires drives a respective one of the M pixel-rows, the M driving signal wires include m first driving signal wires and n second driving signal wires, m and n are both positive integers, and m+n=M; the first driving signal wires are electrically connected to output terminals of respective first shift registers, and the second driving signal wires are electrically connected to output terminals of respective second shift registers;

a first clock signal wire pair and a second clock signal wire pair, where the first clock signal wire pair and the second clock signal wire pair each include two clock signal wires, the first clock signal wire pair is configured to control an operation of the first driving circuit, and the second clock signal wire pair is configured to control an operation of the second driving circuit; and a plurality of touch electrodes configured to transmit touch signals in a touch phase.

The driving method includes: providing a first clock signal with a first period length to the first clock signal wire pair, to control the operation of the first driving circuit;

providing a second clock signal with a second period length to the second clock signal wire pair, to control the operation of the second driving circuit, where each of the first period length and the second period length is composed of widths of one high-level signal and one low-level signal that are adjacent and continuous;

controlling the display panel to execute the touch phase between adjacent display phases; where in the display phase, one clock signal group controls N driving signal wires to provide driving signals to N pixel-rows arranged in sequence, where N is a positive integer and N≥3; the N driving signal wires include a first driving signal wire connected to the first shift register and a second driving signal wire connected to the second shift register, and the clock signal group includes N effective clock signals provided jointly by the first clock signal wire pair and the second clock signal wire pair.

In a second aspect, a display panel is provided according to an embodiment of the present disclosure. The display panel includes:

M pixel-rows arranged in a first direction, where M is a positive integer;

a first driving circuit and a second driving circuit, where the first driving circuit includes a plurality of first shift registers in cascade, and the second driving circuit includes a plurality of second shift registers in cascade;

M driving signal wires, where each one of the M driving signal wires drives a respective one of the M pixel-rows, the M driving signal wires include m first driving signal wires and n second driving signal wires, m and n are both positive integers, and m+n=M; the first driving signal wires are electrically connected to output terminals of respective first shift registers, and the second driving signal wire are electrically connected to output terminals of respective second shift registers;

a first clock signal wire pair and a second clock signal wire pair, wherein the first clock signal wire pair and the second clock signal wire pair each include two clock signal wires, the first clock signal wire pair is configured to control an operation of the first driving circuit, and the second clock signal wire pair is configured to control an operation of the second driving circuit;

a plurality of touch electrodes configured to transmit touch signals in a touch phase;

a display driving module configured to provide a first clock signal with a first period length to the first clock signal wire pair to control the operation of the first driving circuit, and provide a second clock signal with a second period length to the second clock signal wire pair to control the operation of the second driving circuit; where each of the first period length and the second period length is composed of widths of one high-level signal and one low-level signal that are adjacent and continuous; and to control the display panel to execute a plurality of display phases; where in the display phase, one clock signal group controls N driving signal wires to provide driving signals to N pixel-rows arranged in sequence, where N is a positive integer and N≥3; the N driving signal wires include a first driving signal wire connected to the first shift register and a second driving signal wire connected to the second shift register, and the clock signal group includes N effective clock signals provided jointly by the first clock signal wire pair and the second clock signal wire pair; and a touch function module configured to control the display panel to execute a touch phase between the two adjacent display phases.

In a third aspect, a display device is provided according to an embodiment of the present disclosure. The display device includes the display panel provided by any embodiment of the present disclosure.

BRIEF DESCRIPTION OF DRAWINGS

In order to more clearly illustrate the technical solutions in the embodiments of the present disclosure or the related art, the accompanying drawings used in the embodiments or the related art are briefly described below. Obviously, the drawings described below are merely some embodiments of the present disclosure. Based on these drawings, those of ordinary skill in the art can obtain other drawings without any creative effort.

FIG. 6 is a structural schematic diagram of a pixel circuit in a display panel according to an embodiment of the present disclosure;

FIG. 7 is a flowchart of a driving method according to another embodiment of the present disclosure;

DESCRIPTION OF EMBODIMENTS

To clarify objectives, technical solutions, and advantages of embodiments of the present disclosure, the technical solutions in the embodiments of the present disclosure will be described clearly and completely in conjunction with the drawings in the embodiments of the present disclosure. The embodiments described are a part, but not all, of the embodiments of the present disclosure. Based on the embodiments of the present disclosure, all other embodiments obtained by those of ordinary skill in the art without making creative efforts fall within the protection scope of the present disclosure.

The terms used in the embodiments of the present disclosure are merely for the purpose of describing particular embodiments and not intended to limit the present disclosure. Unless the context clearly indicates other meanings, the singular form expressions "a", "an", "the" and "said" used in the embodiments and appended claims of the present disclosure are also intended to represent a plural form.

Figure 1:
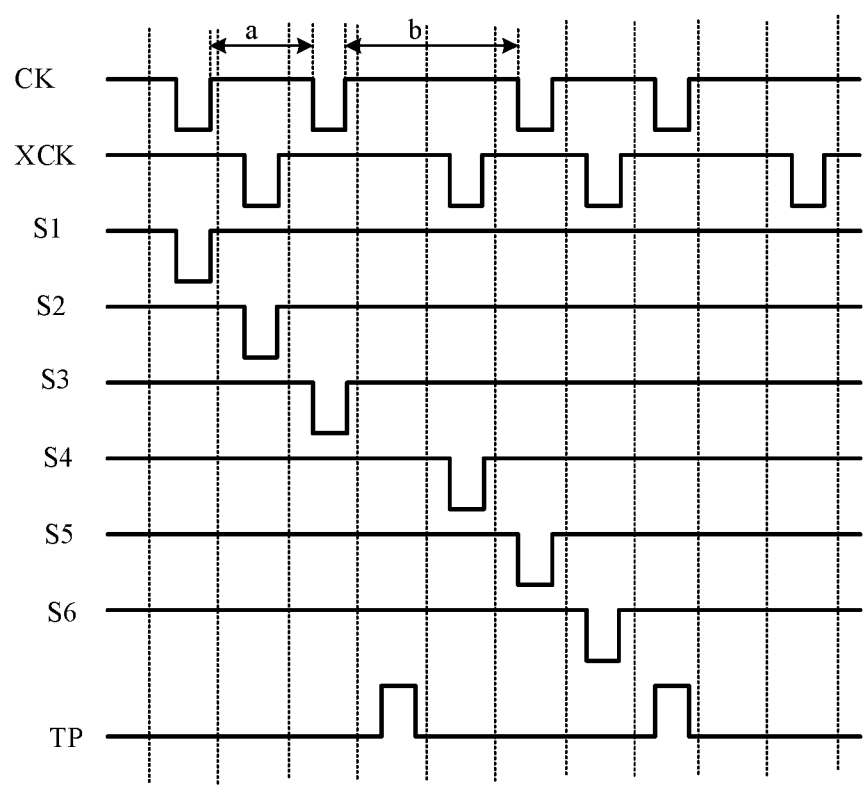
FIG. 1 is a driving timing sequence diagram of a display panel in a related art.

FIG. 1 is a driving timing sequence diagram of a display panel in a related art. As shown in FIG. 1, CK and XCK represent clock signals, which are used to control operation of a driving circuit; S1 to S6 represent driving signals output by a shift register of the driving circuit; and TP represents a touch signal. One shift register drives one pixel-row. It can be known that after every three pixel-rows are driven, touch detection is executed once, thereby realizing time division execution of touch and display. However, a pair of the clock signals CK and XCK for controlling the operation of the driving circuit has an irregular waveform. As shown in FIG. 1, a high level between two adjacent low-level signals has two widths a and b, a≠b. The clock signals are provided by a display driver chip. Thus, the clock signals in the related art has relatively high requirements for the display driver chip.

Based on this, a display panel and a driving method thereof are provided according to an embodiment of the present disclosure, to realize time division of the display and the touch, and control the operation of the driving circuit by transmitting clock signals with a regular period on a clock signal wire pair, reducing requirements of the clock signal on the display drive chip.

Figure 2:
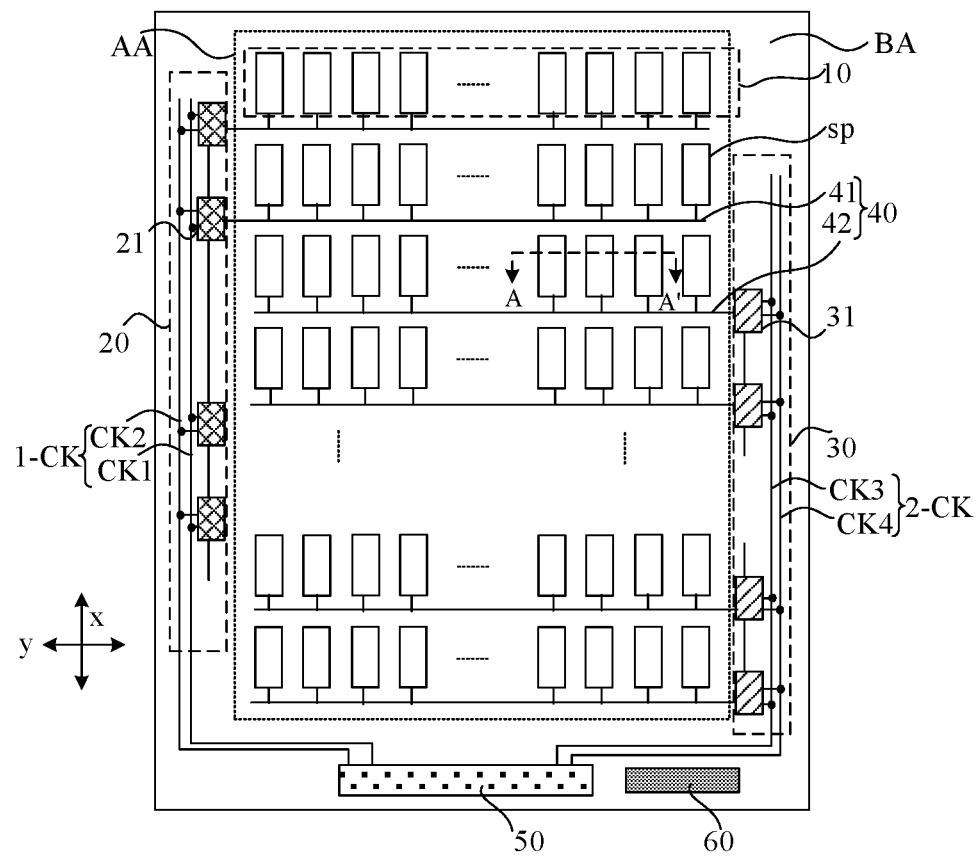
FIG. 2 is a schematic top diagram of a display panel according to an embodiment of the present disclosure.
Figure 3:
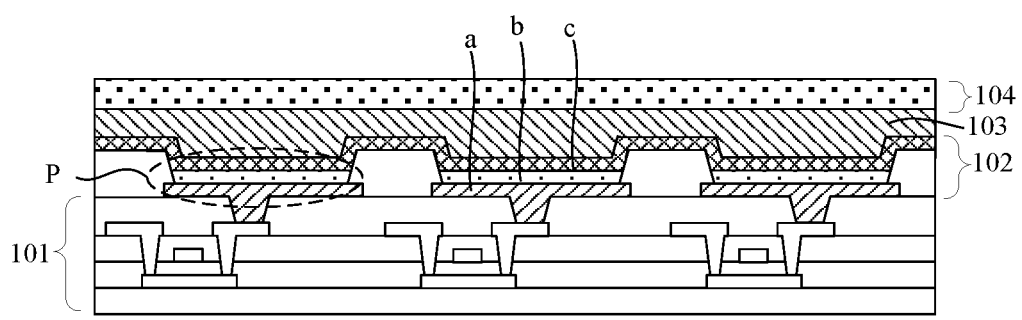
FIG. 3 is a schematic cross-sectional diagram at a tangent line A-A' in FIG. 2.
Figure 4:
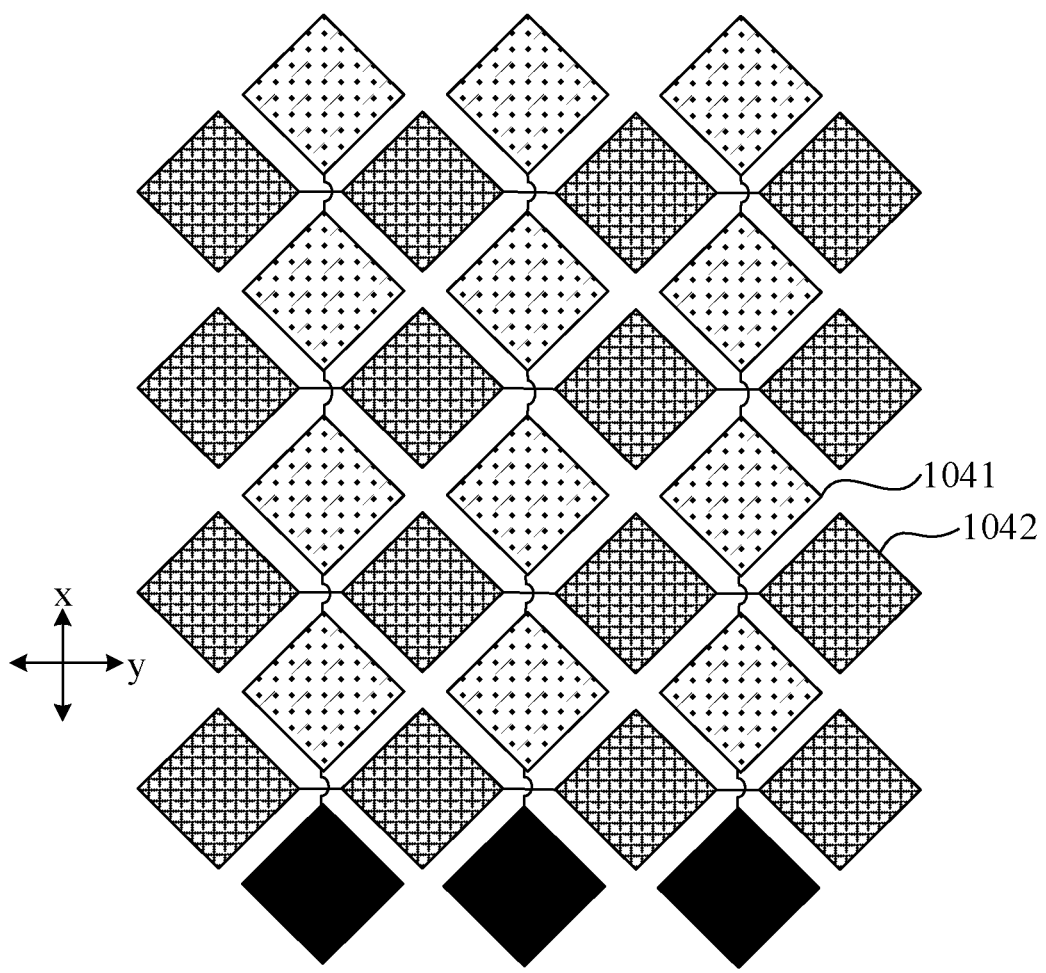
FIG. 4 is a schematic diagram of a film-layer structure where a touch electrode is located in the embodiment of FIG. 2.

FIG. 2 is a schematic top diagram of a display panel according to an embodiment of the present disclosure, and FIG. 3 is a schematic cross-sectional diagram at a tangent line AA' in FIG. 2. FIG. 4 is a schematic diagram of a structure of a film-layer where a touch electrode is located in the embodiment of FIG. 2.

As shown in FIG. 2, the display panel includes: M pixel-rows 10 arranged in a first direction x, where M is a positive integer, and one pixel-row 10 includes a plurality of sub-pixels sp; and a first driving circuit 20 and a second driving circuit 30. FIG. 2 shows that the first driving circuit 20 and the second driving circuit 30 are respectively located at both sides of the display area AA. In another embodiment, the first driving circuit 20 and the second driving circuit 30 are located on the same side of the display area AA. The first driving circuit 20 includes a plurality of first shift registers 21 in cascade, and the second driving circuit 30 includes a plurality of second shift registers 31 in cascade. The display panel further includes M driving signal wires 40. One driving signal wire 40 drives one pixel-row 10. The M driving signal wires 40 include m first driving signal wires 41 and n second driving signal wires 42, where both m and n are positive integers, and m+n=M. The first driving signal wires 41 are electrically connected to output terminals of the respective first shift registers 21, and the second driving signal wires 42 are electrically connected to output terminals of the respective second shift registers 31. That is, for the driving signal wires, a part of driving signal wires are electrically connected to the first shift register 21, and a remaining part of driving signal wires are electrically connected to the second shift register 31. As shown in FIG. 2, the driving signal wires 40 are arranged in sequence in the first direction x, and the first shift registers 21 (or the second shift registers 31) arranged in sequence are also sequentially cascaded in the first direction x.

The display panel further includes a first clock signal wire pair 1-CK and a second clock signal wire pair 2-CK. The first clock signal wire pair 1-CK and the second clock signal wire pair 2-CK each include two clock signal wires. The first clock signal wire pair 1-CK includes a first clock signal wire CK1 and a second clock signal wire CK2. The second clock signal wire pair 2-CK includes a third clock signal wire CK3 and a fourth clock signal wire CK4. The first clock signal wire pair 1-CK is used to control an operation of the first driving circuit 20, and the second clock signal wire 2-CK pair is used to control an operation of the second driving circuit 30.

As shown in FIG. 3, the film layer structure of the display panel is schematically shown, and the display panel includes an array layer 101, a display layer 102, an encapsulation layer 103, and a touch layer 104. The array layer 101 includes a pixel circuit (not shown). The first driving circuit 20 and the second driving circuit 30 are located in respective film layers in the same layer as the array layer 101. The display layer 102 includes multiple light-emitting devices P. The light-emitting device P includes a first electrode a, a light-emitting layer b, and a second electrode c stacked in sequence. The encapsulation layer 103 is used to encapsulate and protect the light-emitting device P in order to isolate water and oxygen. The structure of the encapsulation layer 103 in the drawing is only simplified for illustration. The encapsulation layer 103 can be a thin film encapsulation or a rigid encapsulation. The touch layer 104 is located on a side of the encapsulation layer 103 away from the display layer 102. The touch layer 104 includes multiple touch electrodes used to transmit touch signals in a touch phase.

Specifically, in an embodiment, as shown in FIG. 4, the multiple touch electrodes include first touch electrodes 1041 and second touch electrodes 1042. Multiple first touch electrodes 1041 are sequentially connected in the first direction x to form a touch electrode column, and Multiple second touch electrodes 1042 are sequentially connected in a second direction y to form a touch electrode row.

Figure 5:
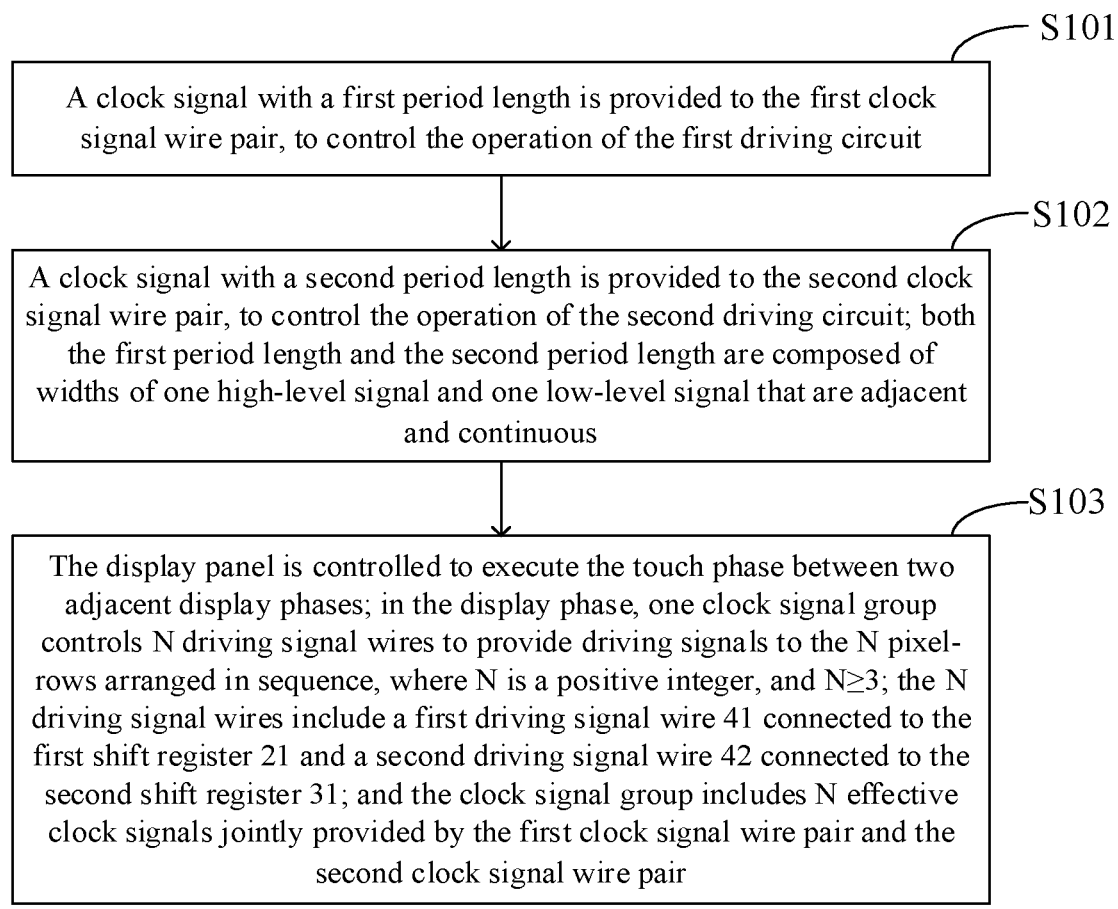
FIG. 5 is a flowchart of a driving method for a display panel according to an embodiment of the present disclosure.

FIG. 5 is a flowchart of a driving method of a display panel according to an embodiment of the present disclosure. As shown in FIG. 5, the driving method includes following steps.

In Step S101, a clock signal with a first period length is provided to the first clock signal wire pair 1-CK, to control the operation of the first driving circuit 20.

In Step S102, a clock signal with a second period length is provided to the second clock signal wire pair 2-CK, to control the operation of the second driving circuit 30. Both the first period length and the second period length are composed of widths of one high-level signal and one low-level signal that are adjacent and continuous. That is, the high-level signals between any two adjacent low-level signals in the clock signals on the first clock signal wire pair have the same width, and the high-level signals between any two adjacent low-level signals in the clock signals on the second clock signal wire pair have the same width. Thus, in the driving method according to the embodiment of the present disclosure, the clock signal with a regular period is provided to the clock signal wire for controlling the operation of the driving circuit, so that the requirements on the display driving module (such as the display driver chip) can be reduced. In different embodiments, the first period length and the second period length may be the same or different. This will be described in following specific embodiments.

In Step S103, the display panel is controlled to execute the touch phase between two adjacent display phases. In the display phase, one clock signal group controls N driving signal wires 40 to provide driving signals to the N pixel-rows 10 arranged in sequence, where N is a positive integer, and N≥3. The N driving signal wires 40 include a first driving signal wire 41 connected to the first shift register 21 and a second driving signal wire 42 connected to the second shift register 31. The clock signal group includes N effective clock signals jointly provided by the first clock signal wire pair 1-CK and the second clock signal wire pair 2-CK.

In an embodiment of the present disclosure, the clock signal group is understood to include a combination of the N effective clock signals provided jointly by the first clock signal wire pair 1-CK and the second clock signal wire pair 2-CK. In the display phase, the first driving circuit 20 and the second driving circuit 30 cooperate and control to provide driving signals to the N driving signal wires 40, so as to provide the driving signals to the N pixel-rows 10 arranged in sequence. In one display phase, the driving signals are sequentially provided to the N driving signal wires in the display panel, and a display process of one frame of image includes multiple display phases. That is, after the display panel is driven to execute multiple display phases, the driving signals are sequentially provided to the M driving signal wires.

In a driving method according to an embodiment of the present disclosure, the clock signals with a regular period are respectively provided to the first clock signal wire pair and the second clock signal wire pair, to separately control the operation of the first driving circuit and the operation of the second driving circuit. In this way, the display process of the display panel is divided into multiple display phases. In the display phase, the clock signal group controls the N driving signal wires to provide driving signals to the N pixel-rows arranged in sequence. Thus, the manner in which the display drive chip sends signals to the clock signal wires is simplified, thereby reducing the requirements on the display drive chip. Moreover, the display panel is controlled to execute the touch phase between two adjacent display phases, through the coordination of the clock signal on the first clock signal wire pair and the clock signal on the second clock signal wire pair. In this way, the time division execution of display and touch is realized, so as to avoid the influence of the display signal during display on the touch signal. In addition, the first clock signal wire pair and the second clock signal wire pair each include two clock signal wires. That is, two clock signal wires are used to control the operation of the first driving circuit, and two clock signal wires are used to control the operation of the second driving circuit. Thus, time division multiplexing of display and touch is realized, and clock signals with a regular period are transmitted on clock signal wires. In addition, it is ensured that under the premise that a refresh rate does not decrease, the requirement for an output capability of the driver chip is reduced, and the difficulty of chip design is reduced.

FIG. 6 is a structural schematic diagram of a pixel circuit in a display panel according to an embodiment of the present disclosure. FIG. 6 illustrates a structure of a 7T1C pixel circuit, which is not a limitation of the present disclosure. The pixel circuit is electrically connected to a light-emitting device P. The pixel circuit includes one driving transistor Tm, 6 switching transistors (T1 to T6), and one pixel capacitor C. A positive power supply voltage terminal PVDD, a negative power supply voltage terminal PVEE, a data voltage terminal Vdata, a first scan voltage terminal S1, a second scan voltage terminal S2, a reset power terminal Vref, and a light-emitting control terminal Emit are also shown. The display panel includes a gate driving circuit, a light-emitting driving circuit, a gate scan wire and a light-emitting control wire. The gate driving circuit is used to provide a gate scan signal to the gate scan wire. The light-emitting driving circuit is used to provide a light-emitting control signal to the light-emitting control wire. The first scan voltage terminal S1 and the second scan voltage terminal S2 are electrically connected to the gate scan wire in the display panel. The light-emitting control terminal Emit is electrically connected to the light-emitting control wire in the display panel. The light-emitting device P is controlled to emit light by a cooperation of the gate driving circuit and the light-emitting driving circuit.

In an embodiment, the driving circuit in the embodiment of the present disclosure is a gate driving circuit. The first driving circuit includes a first gate driving circuit, the second driving circuit includes a second gate driving circuit, and the driving signal wire includes a gate scan wire. In the driving method according to the embodiment of the present disclosure, clock signals with a regular period are provided to the clock signal wire pair for driving the first gate driving circuit, and at the same time, clock signals with a regular period are provided to the clock signal wire pair for driving the second gate driving circuit, so as to provide the driving signal to the corresponding gate scan wire through the gate driving circuit. Then, a driving signal is provided to the light-emitting control wire through a cooperation of the light-emitting driving circuit, such that the corresponding light-emitting device is controlled to emit light, so as to realize a touch detection between two adjacent display phases.

In another embodiment, the driving circuit in the embodiment of the present disclosure is a light-emitting driving circuit. The first driving circuit includes a first light-emitting driving circuit, and the second driving circuit includes a second light-emitting driving circuit. The driving signal wire includes a light-emitting control wire. In the driving method according to the embodiment of the present disclosure, clock signals with a regular period are provided to the clock signal wire pair for driving the first light-emitting driving circuit, and at the same time, clock signals with a regular period are provided to the clock signal wire pair for driving the second light-emitting driving circuit, so as to provide the driving signal to the corresponding light-emitting control wire through the light-emitting driving circuit. Then, a driving signal is provided to the gate scan wire through a cooperation of the gate driving circuit, such that the corresponding light-emitting device is controlled to emit light, so as to realize a touch detection between two adjacent display phases.

Specifically, referring to the above-mentioned FIG. 2, the display panel provided by an embodiment of the present disclosure includes a display driving module 50 and a touch function module 60. In an embodiment, the display driving module 50 is a display driving chip, and the touch function module 60 is a touch driving chip. The display driving module 50 is configured to provide a clock signal with a first period length to the first clock signal wire pair 1-CK under the control, in order to control the operation of the first driving circuit 20; and to provide a clock signal with a second period length to the second clock signal wire pair 2-CK under the control, in order to control the operation of the second driving circuit 30. The first period length and the second period length are each composed of a width of one high-level signal and a width of one low-level signal, where the high-level signal and the low-level signal are adjacent and continuous. The display driving module 50 is further configured to control the display panel to execute multiple display phases. In the display phase, one clock signal group controls N driving signal wires 40 to provide driving signals to the N pixel-rows 10 arranged in sequence, where N is a positive integer and N≥3. The N driving signal wires 40 include a first driving signal wire 41 connected to the first shift register 20 and a second driving signal wire 42 connected to the second shift register 30. The clock signal group includes N effective clock signals jointly provided by the first clock signal wire pair 1-CK and the second clock signal wire pair 2-CK. The touch function module 60 is configured to control the display panel to execute a touch phase between two adjacent display phases. The display panel provided by the embodiment of the present disclosure is driven by the driving method provided in the embodiment of FIG. 5 described above.

Further, FIG. 7 is a flowchart of a driving method according to another embodiment of the present disclosure. As shown in FIG. 7, the driving method includes step S201. In step S201, the display phase includes at least one display period, the display period includes at least one first sub-phase and at least one second sub-phase, and the first sub-phase and the second sub-phase are alternately executed. In the first sub-phase, the effective clock signal provided by the first clock signal wire pair controls the first driving signal wire to provide a driving signal to the pixel-row. In the second sub-phase, the effective clock signal provided by the second clock signal wire pair controls the second driving signal wire to provide a driving signal to the pixel-row.

Specifically, the N driving signal wires providing the driving signals to the N pixel-rows arranged in sequence is completed in one display phase. The display phase includes one display period. Alternatively, the display phase may include two or more display periods. In a specific embodiment, the number of the display periods in the display phase is related to a period length of the touch detection. The display period is understood as providing driving signals to a fixed number of driving signal wires arranged in sequence in the display panel in one display period. Moreover, under the cooperation of the first clock signal wire pair and the second clock signal wire pair, the first driving circuit and the second driving circuit are controlled to alternately provide driving signals to the corresponding driving signal wires in one display period. Therefore, when the first clock signal wire pair and the second clock signal wire pair both transmit the clock signals with the regular period, the number of the driving signal wires that receive driving signals in each display phase is the same, then the period time length of each display phase is the same, and the period time length of each touch phase is the same. In this way, the time division execution of display and touch is realized, and the driving modes of the display phase and the touch phase are simplified.

In some embodiments, by a cooperation of the period length of the clock signal transmitted through the first clock signal wire pair, the period length of the clock signal transmitted through the second clock signal wire pair, and the connection mode of the driving signal wire and the driving circuit in the display panel, each display phase with the same period time length and each touch phase with the same period time length are realized when the first clock signal wire pair and the second clock signal wire pair both transmit clock signals with a regular period. In this way, time division execution of display and touch is realized.

Specifically, in some embodiments, the second period length is greater than the first period length. In the first sub-phase, an effective clock signal provided by the first clock signal wire pair controls two first shift registers in cascade to respectively provide driving signals to two adjacent first driving signal wires. In the second sub-phase, an effective clock signal provided by the second clock signal wire pair controls one second shift register to provide a driving signal to one second driving signal wire. In this embodiment, through the coordination of the clock signals transmitted by the first clock signal wire pair and the second clock signal wire pair, the first driving circuit and the second driving circuit alternately providing the driving signals to the corresponding driving signal wire is realized in the display phase. Furthermore, in the display phase, the N driving signal wires are further controlled to provide driving signals to the N pixel-rows arranged in sequence, so as to realize the time division execution of display and touch.

In an embodiment, N=3*p, where p is a positive integer. The display phase includes p display periods. In one display phase, driving signals are provided to an integral multiple of 3 driving signal wires, so as to control to provide driving signals to an integral multiple of 3 pixel-rows arranged in sequence. That is, after every an integral multiple of 3 pixel-rows are displayed, the display panel is driven to execute the touch detection once.

Figure 8:
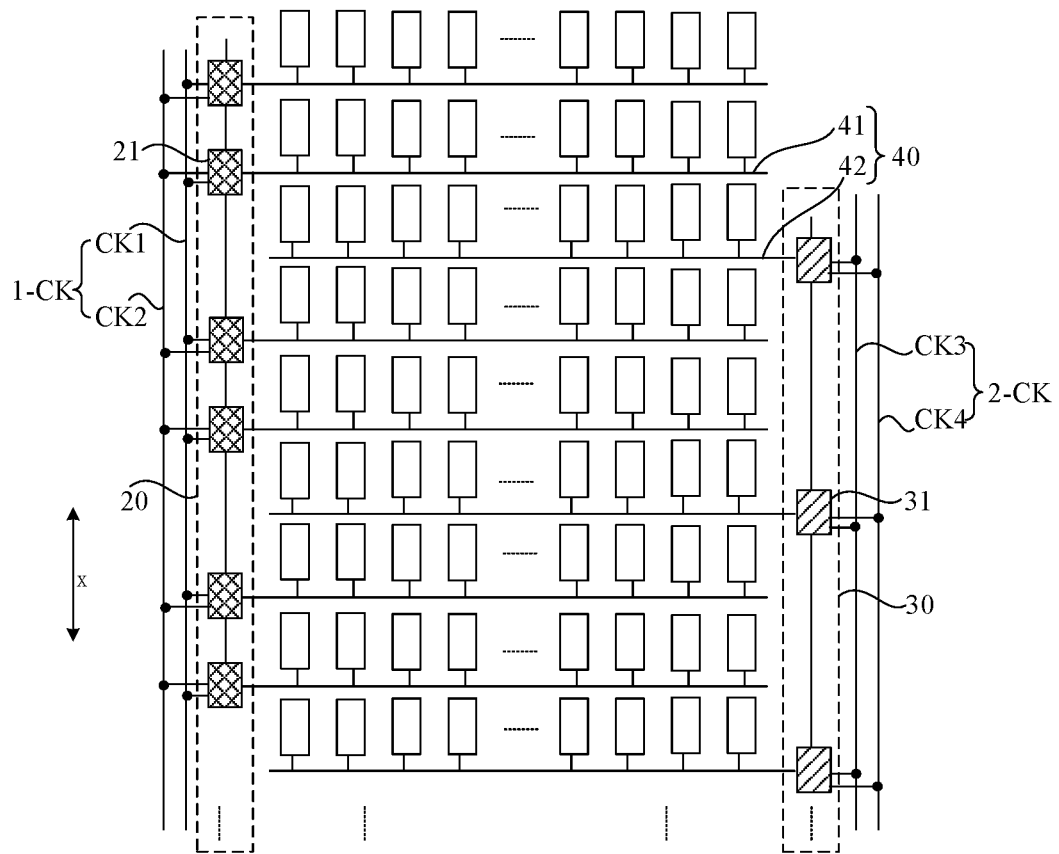
FIG. 8 is a schematic top diagram of a display panel according to another embodiment of the present disclosure.
Figure 9:
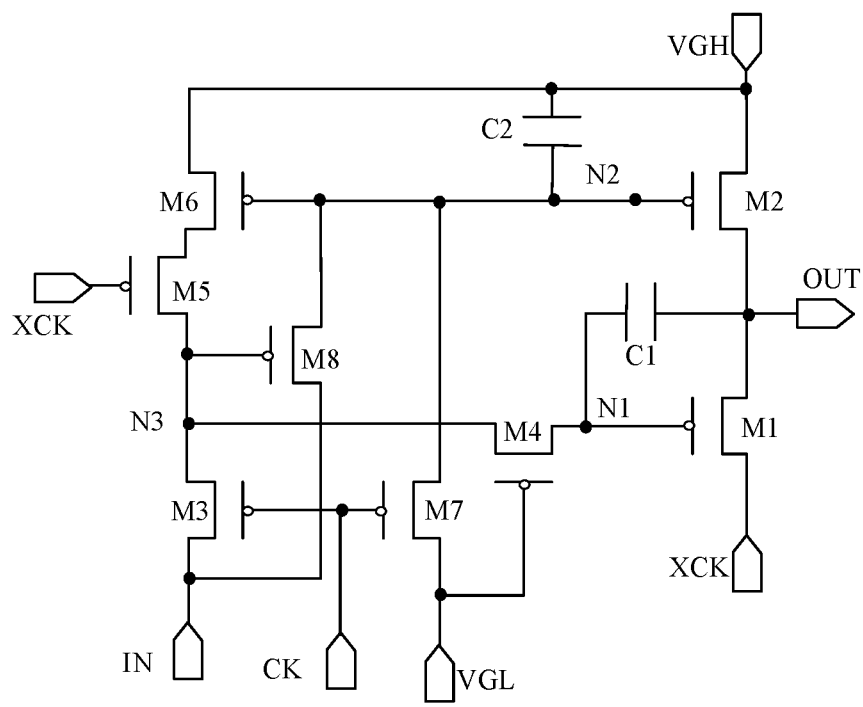
FIG. 9 is a structural schematic diagram of a shift register in the display panel provided by the embodiment of FIG. 8.
Figure 10:
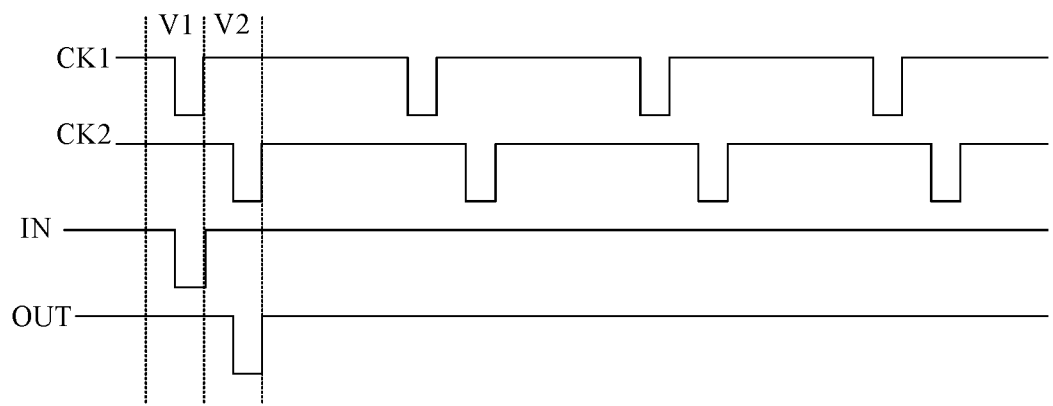
FIG. 10 is a driving timing sequence diagram of the shift register illustrated in the embodiment of FIG. 9.
Figure 11:
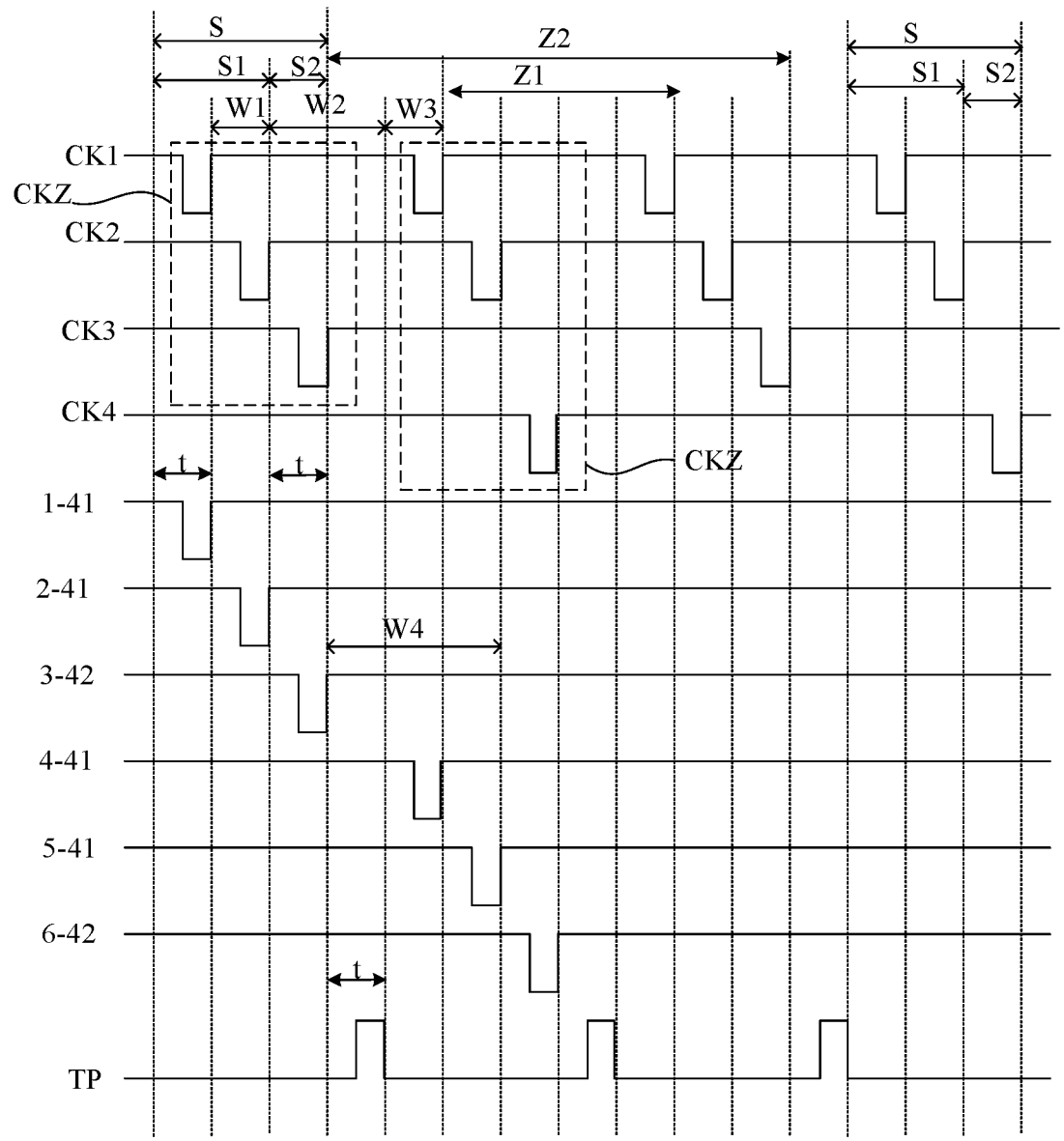
FIG. 11 is a driving timing sequence diagram of the display panel provided by the embodiment of FIG. 8.

Specifically, FIG. 8 is a schematic top diagram of a display panel according to another embodiment of the present disclosure. FIG. 9 is a structural schematic diagram of a shift register in the display panel provided by the embodiment of FIG. 8. FIG. 10 is a driving timing sequence diagram of the shift register illustrated in the embodiment of FIG. 9. FIG. 11 is a driving timing sequence diagram of the display panel provided in the embodiment of FIG. 8.

As shown in FIG. 8, two first driving signal wires 41 and one second driving signal wire 42 are alternately arranged in the first direction x. The first driving signal wire 41 is electrically connected to the first shift register 21, and the second driving signal wire 42 is electrically connected to the second shift register 31. The first clock signal wire pair 1-CK includes a first clock signal wire CK1 and a second clock signal wire CK2. The second clock signal wire pair 2-CK includes a third clock signal wire CK3 and a fourth clock signal wire CK4. The first clock signal wire CK1 and the second clock signal wire CK2 cooperate to control the operation of the first driving circuit 20. The third clock signal wire CK3 and the fourth clock signal wire CK4 cooperate to control the operation of the second driving circuit 30. When the display panel displays, for example, a process of providing driving signals to M driving signal wires from top to bottom includes: respectively providing driving signals to two first driving signal wires 41 by the first driving circuit 20; providing a driving signal to one second driving signal wire 42 by the second driving circuit 30; respectively providing driving signals to two first driving signal wires 41 by the first driving circuit 20; providing a driving signal to one second driving signal wire 42 by the second driving circuit 30; and alternately executing the above steps until driving signals are provided to the M driving signal wires.

As shown in FIG. 9, a structure of a shift register is shown, which includes 8 transistors from M1 to M8 and two capacitors (C1 and C2). In addition, a clock signal terminal XCK\CK, an input terminal IN, an output terminal OUT, a high-level signal terminal VGH, and a low-level signal terminal VGL are also shown in FIG. 9. In cascaded shift registers, an input terminal IN of a first stage of shift register is connected to a start signal terminal, and an input terminal IN of each remaining shift register is connected to an output terminal OUT of a previous stage of shift register.

Taking the first driving circuit 20 as an example, a clock signal terminal CK of an odd number stage of first shift register is connected to the second clock signal wire CK2, and a clock signal terminal XCK of the odd number stage of the first shift register is connected to the first clock signal wire CK1. A clock signal terminal CK of an even number stage of a first shift register is connected to the first clock signal wire CK1, and a clock signal terminal XCK of the even number stage of the first shift register is connected to the second clock signal wire CK2. In other words, one kind of driving circuit corresponds to two clock signal wires (that is, one clock signal wire pair), and one shift register has two kinds of clock signal terminals. In the embodiments of the present disclosure, a connection manner of the shift register and the clock signal wire can be understood with reference to the above description, and it will not be repeated in the following embodiments.

A working process of the second stage of first shift register is described with reference to the timing sequence diagram shown in FIG. 10. A clock signal terminal CK of the second stage of first shift register is connected to the first clock signal wire CK1, and a clock signal terminal XCK of the second stage of the first shift register is connected to the second clock signal wire CK2. At the first moment V1, the first clock signal wire CK1 provides a low-level signal to the clock signal terminal CK, and the low-level signal is input to the input terminal IN. At this time, the transistor M3 is turned on, and a node N3 is at a low potential; a transistor M8 is turned on and the node N2 is at a low potential, and then the transistor M2 is turned on, and the high-level signal terminal VGH provides a high-level signal to the output terminal OUT. At the same time, the node N1 is at a low level, the transistor M1 is turned on, and the clock signal terminal XCK provides a high-level signal of the second clock signal wire CK2 to the output terminal OUT. At the second time V2, the second clock signal wire CK2 provides a low-level signal to the clock signal terminal XCK, the first clock signal wire CK1 provides a high-level signal to the clock signal terminal CK, the high-level signal is input to the input terminal IN. Since the node N3 is at a low potential, the transistor M8 is turned on, to provide the high-level signal of the input terminal IN to the node N2. At this time, both the transistor M2 and the transistor M6 are turned off; the node N1 is at a low potential, the second clock signal wire CK2 provides a low-level signal to the clock signal terminal XCK, and the output terminal OUT outputs the low-level signal of the clock signal terminal XCK. Thus, at the second time V2, the second stage of the first shift register provides the driving signal to the first driving signal wire connected thereto. It can be known that in a time session where the clock signal terminal XCK receives an effective clock signal (it is shown as a low-level signal in this embodiment), the output terminal of the shift register provides a driving signal to the driving signal wire, and then the driving signal wire provides the driving signal to the pixel-row connected to the driving signal wire.

To understand with reference to the timing sequence diagram shown in FIG. 11, as shown in FIG. 11, the second period length Z2 of the clock signal provided to the second clock signal wire pair 2-CK is greater than the first period length Z1 of the clock signal provided to the first clock signal wire pair 1-CK. FIG. 11 shows the driving signals transmitted on six driving signal wires 1-41, 2-41, 3-42, 4-41, 5-41 and 6-42 arranged in sequence in the first direction x. The driving signal wires 1-41, 2-41, 4-41 and 5-41 are all first driving signal wires, and the driving signal wires 3-42 and 6-42 are second driving signal wires.

As an example, the first driving signal wire 1-41 is connected to an output terminal of the first stage of first shift register, the first driving signal wire 2-41 is connected to an output terminal of the second stage of first shift register, the first driving signal wire 4-41 is connected to an output terminal of the third stage of first shift register, and the first driving signal wire 5-41 is connected to an output terminal of the fourth stage of first shift register. According to the above description, the clock signal terminal CK of the third stage of first shift register is connected to the second clock signal wire CK2, and the clock signal terminal XCK of the third stage of first shift register is connected to the first clock signal wire CK1. At a moment W1, the second clock signal wire CK2 provides a low-level signal to the clock signal terminal CK, the first clock signal wire CK1 provides a high-level signal to the clock signal terminal XCK, and an output terminal OUT of the third stage of first shift register outputs a high-level signal. At a moment W2, the output terminal OUT of the third stage of first shift register maintains to output the high-level signal. At a moment W3, the first clock signal wire CK1 provides a low-level signal to the clock signal terminal XCK, and the output terminal OUT of the third stage of first shift register outputs a low-level signal (an effective clock signal). Thus, at the moment W3, the driving signal of the low-level signal is transmitted on the first driving signal wire 4-41. Therefore, there is a certain time interval between the second stage of first shift register outputting the driving signal and the third stage of first shift register outputting the driving signal, i.e., a time period of the moment W2. In the time period of the moment W2, the second shift register provides the driving signal to the second driving signal wire 3-42, and the touch phase is completed.

It can be known from the above description that, in the embodiment of the present disclosure, the clock signal with a regular period is transmitted on the first clock signal wire pair, and a relatively large time interval (the time interval W2 shown in FIG. 11) between the driving signals output by some adjacent stages of first shift registers under the control can be realized. Similarly, it can be understood that by controlling the clock signal transmitted on the second clock signal wire pair, a relatively large time interval (the time interval W4 shown in FIG. 11) between the driving signals output by some adjacent stages of second shift registers under the control can be realized. Therefore, the first driving circuit and the second driving circuit can alternately provide driving signals to the corresponding driving signal wires, and the touch detection can be performed at a time period in which the time interval W2 overlaps with the time interval W4, thereby realizing time division execution of display and touch.

In the embodiment shown in FIG. 11, one clock signal group CKZ includes three effective clock signals, and a case where a low-level signal transmitted on the clock signal wire is an effective clock signal is taken as an example. Two effective clock signals are provided on the first clock signal wire pair, and one effective clock signal is provided on the second clock signal wire pair. The one clock signal group CKZ controls three driving signal wires to provide driving signals to three pixel-rows arranged in sequence. A time length by which the driving signal wire provides the driving signal to each pixel-row is t. The second period length Z2 is 8*t, and the first period length Z1 is 4*t. In addition, one display period S includes one first sub-phase S1 and one second sub-phase S2. In the first sub-phase S1, the effective clock signal provided by the first clock signal wire pair controls two cascaded first shift registers 21 to respectively provide driving signals to two adjacent first driving signal wires. That is, the driving signals are respectively provided to two adjacent pixel-rows in the first sub-phase S1. In the second sub-phase S2, the effective clock signal provided by the second clock signal wire pair controls one second shift register 31 to provide the driving signal to one second driving signal wire. That is, the driving signal is provided to one pixel-row in the second sub-phase S2. In this embodiment, the display period in the display phase is in a "2+1" driving mode. The "2+1" driving mode is understood as: the first driving circuit driving two rows of the pixel-rows+the second driving circuit driving one row of the pixel-row to complete one display period. In this driving mode, each time after the driving signals are provided to 3 pixel-rows arranged in sequence, the touch detection is controlled to be executed once, thereby realizing time division execution of the display and touch.

In addition, the timing sequence of the first clock signal wire pair and the timing sequence of the second clock signal wire pair illustrated in the embodiment of FIG. 11 can also be applied to an embodiment where the touch detection is controlled to be executed once each time after the driving signals are provided to an integral multiple of 3 pixel-rows arranged in sequence. For example, in an embodiment where the touch detection is controlled to be executed once each time after driving signals are provided to 6 pixel-rows arranged in sequence, each display phase includes two display periods as shown in the embodiment of FIG. 11. That is, after the two display periods are completed, the touch detection is executed once. Correspondingly, in an embodiment where the touch detection is controlled to be executed once each time after the driving signals are provided to 9 pixel-rows arranged in sequence, each display phase includes three display periods as shown in the embodiment of FIG. 11. That is, after the three display periods are completed, the touch detection is executed once.

In another embodiment, N=5*p, p is a positive integer; and the display phase includes p display periods. That is, the driving signals are provided to an integral multiple of 5 driving signal wires in one display phase, so as to control to provide driving signals to an integral multiple of 5 pixel-rows sequentially arranged. Thus, each time after an integral multiple of 5 pixel-rows are displayed, the display panel is driven to execute the touch detection once.

Figure 12:
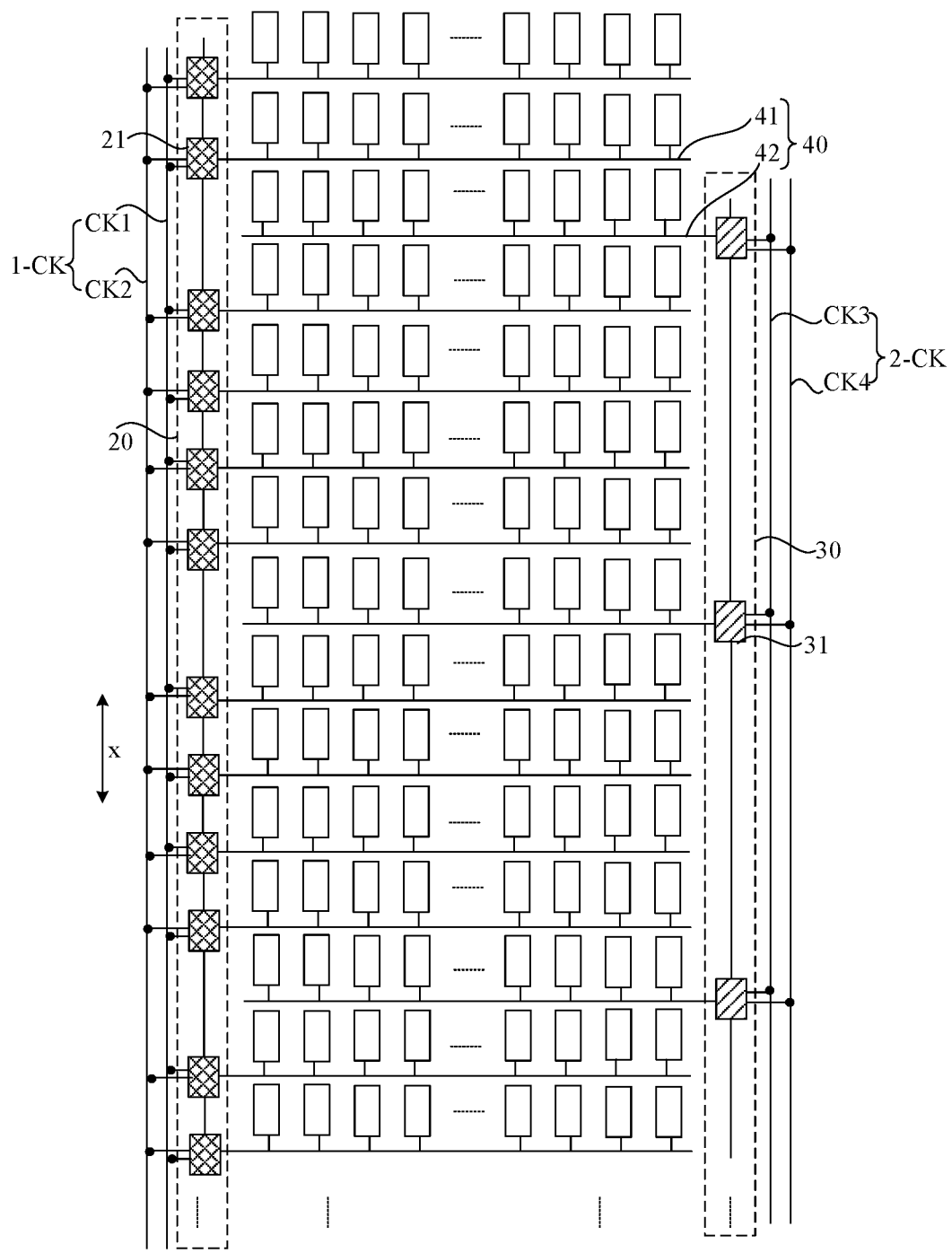
FIG. 12 is a schematic top diagram of a display panel according to another embodiment of the present disclosure.
Figure 13:
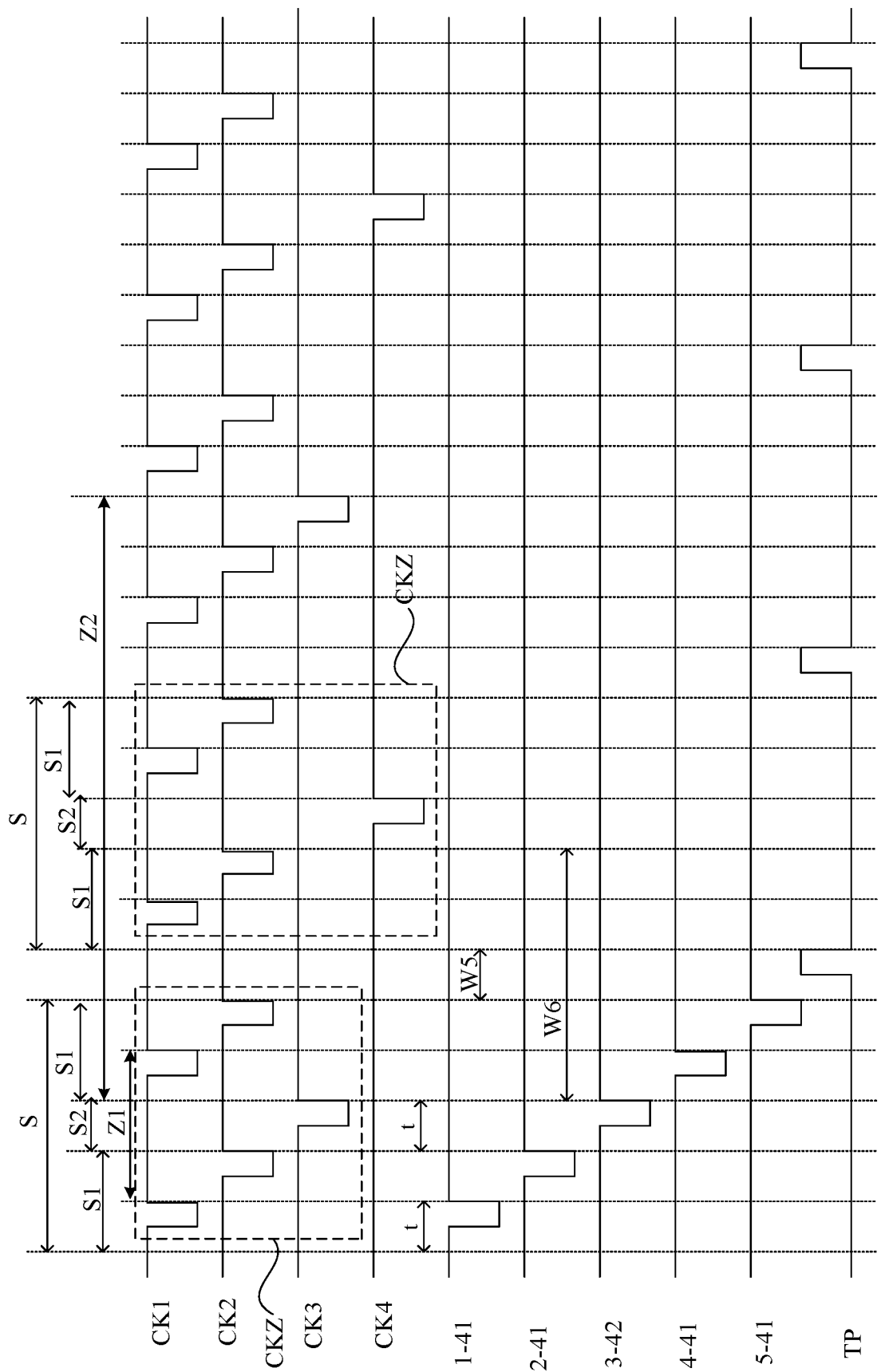
FIG. 13 is a driving timing sequence diagram of the display panel provided in the embodiment of FIG. 12.

Specifically, FIG. 12 is a schematic top diagram of a display panel according to another embodiment of the present disclosure, and FIG. 13 is a driving timing sequence diagram of the display panel provided in the embodiment of FIG. 12. FIG. 12 illustrates a connection mode of driving signal wires and driving circuits. The driving method of the display panel can be understood in conjunction with the timing sequence diagram shown in FIG. 13. The timing sequence diagram of FIG. 13 shows that the second period length Z2 of the clock signal provided to the second clock signal wire pair 2-CK is greater than the first period length Z1 of the clock signal provided to the first clock signal wire pair 1-CK. One clock signal group CKZ includes five effective clock signals. The first clock signal wire pair 1-CK provides four effective clock signals, and the second clock signal wire pair 2-CK provides one effective clock signal. One clock signal group CKZ controls 5 driving signal wires to provide driving signals to 5 pixel-rows arranged in sequence. A time length by which the driving signal wire provides a driving signal to each pixel-row is t. The second period length is 12*t, and the first period length is 3*t. In this embodiment, the display period S includes two first sub-phases S1 and one second sub-phase S2. The embodiment of FIG. 13 illustrates that one display phase includes one display period S. After the first one of first sub-phases S1, a second sub-phase S2 and the second one of first sub-phases S1 are sequentially completed in the display phase, the display panel executes the touch phase. In this embodiment, one display period is in a "2+1+2" driving mode. The "2+1+2" driving mode is understood as: the first driving circuit driving two pixel-rows+the second driving circuit driving one pixel-row+the first driving circuit driving two pixel-rows. The first driving circuit and the second driving circuit alternately drive to complete one display period.

FIG. 13 shows driving signals transmitted on five driving signal wires 1-41, 2-41, 3-42, 4-41, 5-41 arranged in sequence in the first direction x. The driving signal wires 1-41, 2-41, 4-41, 5-41 are all first driving signal wires, and the driving signal wire 3-42 is the second driving signal wire. In the first one of first sub-phases S1, the effective clock signal provided by the first clock signal wire pair 1-CK controls the two cascaded first shift registers 21 to respectively provide driving signals to the two adjacent first driving signals wires (1-41 and 2-41). Then, the driving signals are respectively provided to two adjacent pixel-rows in the first one of first sub-phases S1. In the second sub-phase S2, the effective clock signal provided by the second clock signal wire pair 2-CK controls one second shift register 31 to provide a driving signal to one second driving signal wire (3-42). Then, in the second sub-phase S2, the driving signal is provided to one pixel-row. In the second one of first sub-phases S1, the effective clock signal provided by the first clock signal wire pair 1-CK controls the two cascaded first shift registers 21 to respectively provide driving signals to the two adjacent first driving signal wires (4-41, 5-41). In this way, 5 driving signal wires are controlled to provide driving signals to the 5 pixel-rows arranged in sequence in one display phase. By designing the first period length and the second period length and combining with a connection mode of the driving signal wire and the driving circuit in the display panel, a relatively large time interval (the time interval W5 shown in FIG. 13) between the driving signals output by some adjacent stages of first shift registers under the control can be realized. Besides, there is a relatively large time interval (the time interval W6 shown in FIG. 13) between the driving signals output by some adjacent stages of second shift registers under the control. Therefore, the first driving circuit and the second driving circuit can alternately provide driving signals to the corresponding driving signal wires, and the touch detection can be performed at a time period W5 in which the time interval W5 overlaps with the time interval W6, thereby realizing time division execution of display and touch. In this embodiment, it can be realized that each time after the driving signals are provided to 5 pixel-rows arranged in sequence, the touch detection is controlled to be executed once.

In addition, the timing sequence of the first clock signal wire pair and the timing sequence of the second clock signal wire pair illustrated in the embodiment of FIG. 13 can also be applied to an embodiment where the touch detection is controlled to be executed once each time after driving signals are provided to an integral multiple of 5 pixel-rows arranged in sequence. For example, in an embodiment where the touch detection is controlled to be executed once each time after driving signals are provided to 10 pixel-rows arranged in sequence, each display phase includes two display periods as shown in the embodiment of FIG. 13. That is, after the two display periods are completed, the touch detection is executed once. Correspondingly, in an embodiment where the touch detection is controlled to be executed once each time after driving signals are provided to 15 pixel-rows arranged in sequence, each display phase includes three display periods as shown in the embodiment of FIG. 13. That is, after the three display periods are completed, the touch detection is executed once.

In another embodiment, N=8*p, p is a positive integer; and the display phase includes p display periods. That is, in one display phase, the driving signals are provided to an integral multiple of 8 driving signal wires, so as to control providing driving signals to an integral multiple of 8 pixel-rows arranged in sequence. Thus, each time after an integral multiple of 8 pixel-rows are displayed, the touch detection is executed once.

Figure 14:
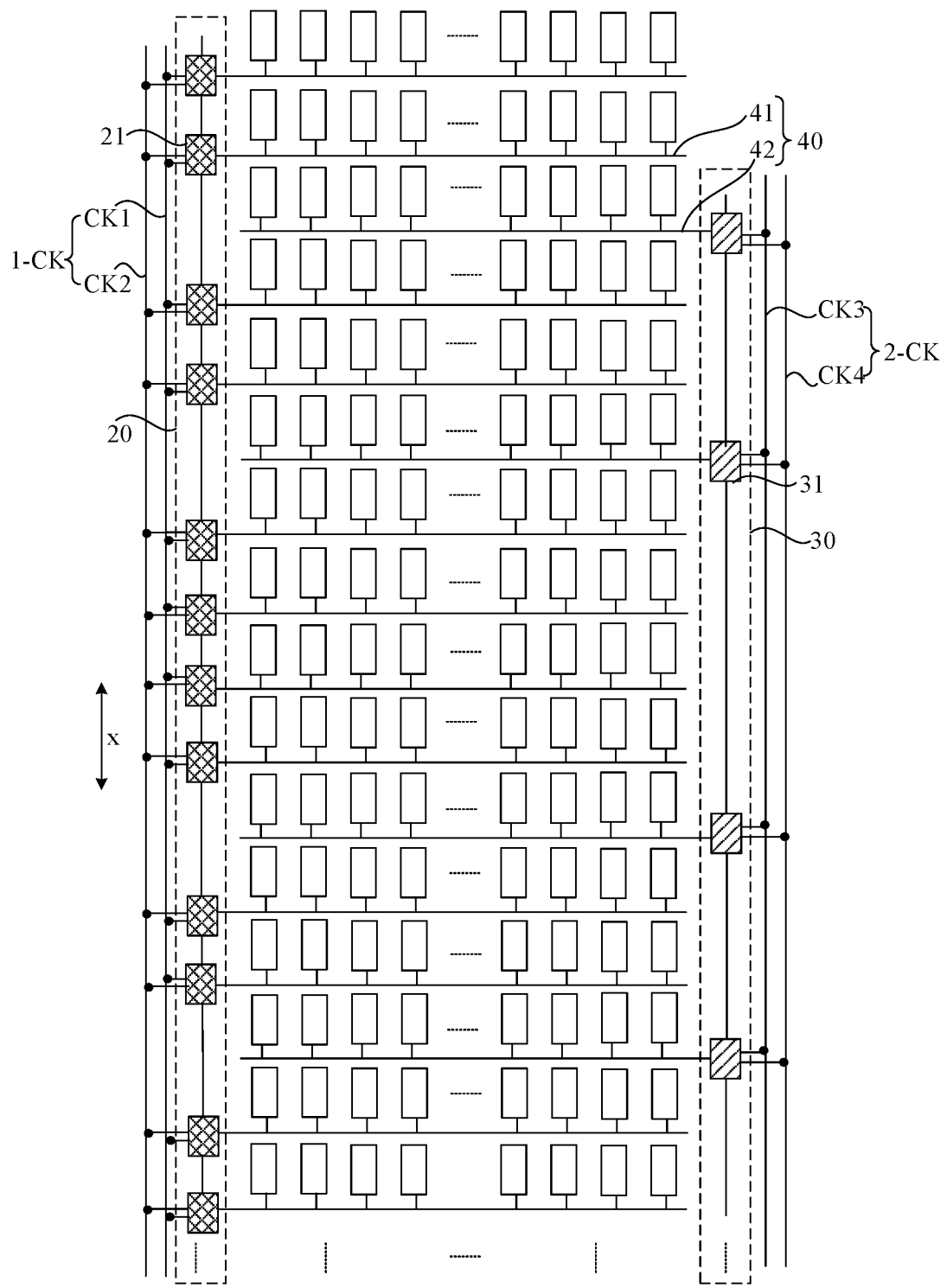
FIG. 14 is a schematic top diagram of a display panel according to another embodiment of the present disclosure.
Figure 15:
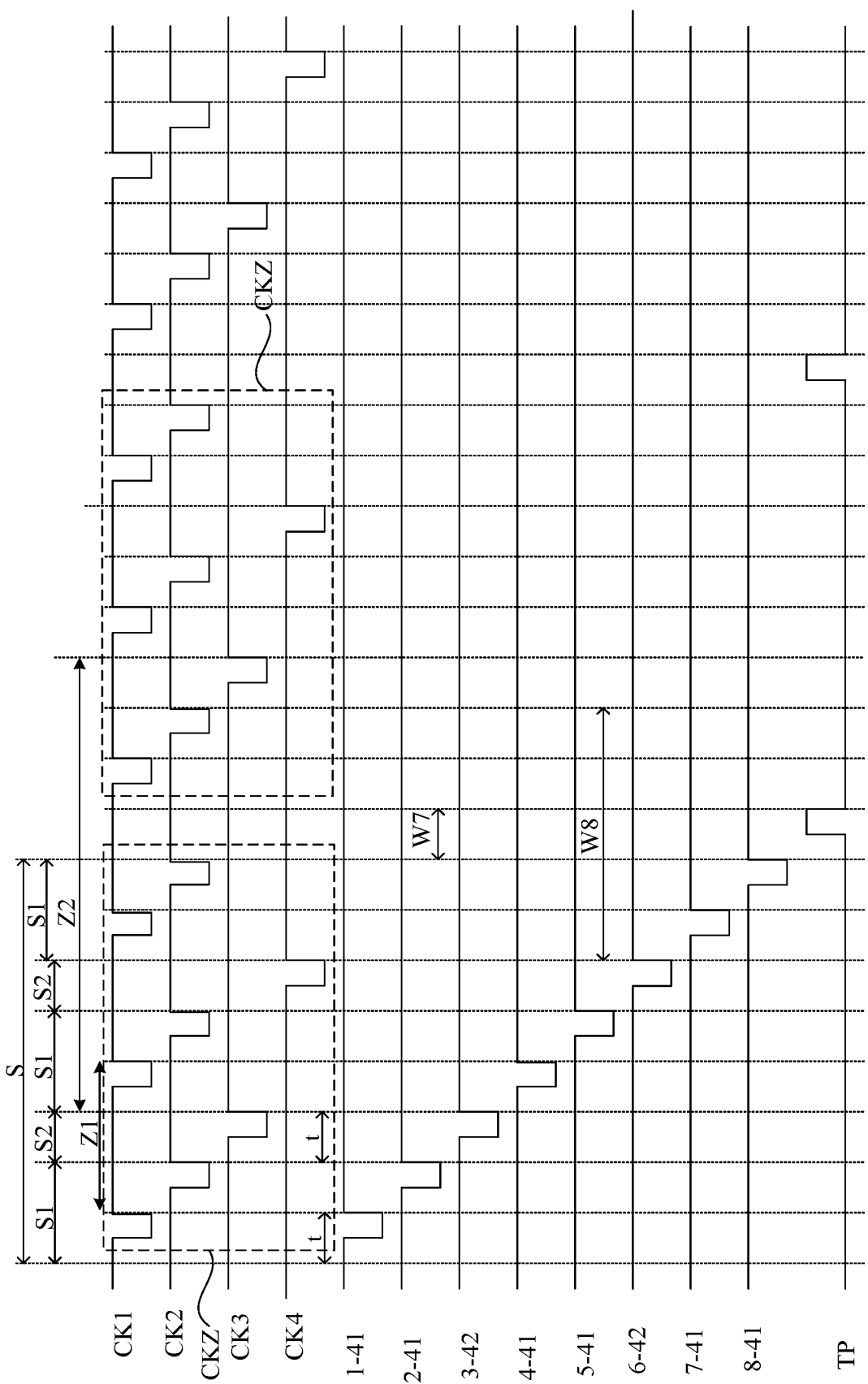
FIG. 15 is a driving timing sequence diagram of the display panel provided of FIG. 14.

Specifically, FIG. 14 is a schematic top diagram of a display panel according to another embodiment of the present disclosure, and FIG. 15 is a driving timing sequence diagram of the display panel provided in the embodiment of FIG. 14. FIG. 14 illustrates a connection manner of the driving signal wire and the driving circuit, and the driving method of the display panel can be understood in conjunction with the timing sequence diagram shown in FIG. 15. The timing sequence diagram of FIG. 15 shows that the second period length Z2 of the clock signal provided to the second clock signal wire pair 2-CK is greater than the first period length Z1 of the clock signal provided to the first clock signal wire pair 1-CK. One clock signal group CKZ includes eight effective clock signals. The first clock signal wire pair 1-CK provides six effective clock signals, and the second clock signal wire pair 2-CK provides two effective clock signals. One clock signal group CKZ controls 8 driving signal wires to provide driving signals to 8 pixel-rows arranged in sequence. A time length by which the driving signal wire provides a driving signal to each pixel-row is t. The second period length Z2 is 9*t, and the first period length Z1 is 3*t. In this embodiment, the display period includes three first sub-phases S1 and two second sub-phases S2. In the embodiment of FIG. 15, a case where one display phase includes one display period S is taken for illustration. One display period is in a "2+1+2+1+2" driving mode. The driving mode "2+1+2+1+2" is understood as: the first driving circuit driving two pixel-rows+the second driving circuit driving one pixel-row+the first driving circuit driving two pixel-rows+the second driving circuit driving one pixel-row+the first driving circuit driving two pixel-rows. The first driving circuit and the second driving circuit alternately drive to complete one display period.

FIG. 15 shows driving signal transmitted on eight driving signal wires 1-41, 2-41, 3-42, 4-41, 5-41, 6-42, 7-41, 8-41 arranged in sequence in the first direction x. The driving signal wires 1-41, 2-41, 4-41, 5-41, 7-41, and 8-41 are all first driving signal wires, and the driving signal wires 3-42 and 6-42 are second driving signal wires. In the first sub-phase S1, the effective clock signal provided by the first clock signal wire pair 1-CK controls the two cascaded first shift registers 21 to respectively provide driving signals to two adjacent first driving signal wires. In the second sub-phase S2, the effective clock signal provided by the second clock signal wire pair 2-CK controls one second shift register 31 to provide a driving signal to one second driving signal wire. The first sub-phase S1 and the second sub-phase S2 are executed alternately. After three first sub-phases S1 and two second sub-phases S2 are completed, a process in which 8 driving signal wires are controlled to provide driving signals to 8 pixel-rows arranged in sequence in one display phase is completed. By designing the first period length and the second period length and combining with the connection mode of the driving signal wire and the driving circuit in the display panel, a relatively large time interval (a time interval W7 shown in FIG. 15) between the driving signals output by some adjacent stages of first shift registers under the control can be realized. In addition, there is a relatively large time interval (a time interval W8 shown in FIG. 15) between the driving signals output by some adjacent stages of second shift registers under the control can be realized. Therefore, the first driving circuit and the second driving circuit can alternately provide driving signals to the corresponding driving signal wires. In addition, the touch detection may be performed at a time period W7 in which the time interval W7 overlaps with the time interval W8, thereby realizing time division execution of display and touch. In this implementation manner, each time after the driving signals are provided to 8 pixel-rows arranged in sequence, the touch detection is controlled to be executed once.

In addition, the timing sequence of the first clock signal wire pair and the timing sequence of the second clock signal wire pair illustrated in the embodiment of FIG. 15 can also be applied to an embodiment where the touch detection is controlled to be executed once each time after the driving signals are provided to an integral multiple of 8 pixel-rows arranged in sequence. For example, in an embodiment where the touch detection is controlled to be executed once each time after driving signals are provided to 16 pixel-rows arranged in sequence, each display phase includes two display periods as shown in the embodiment of FIG. 15. That is, after the two display periods are completed, the touch detection is executed once. Correspondingly, in an embodiment where the touch detection is controlled to be executed once each time after the driving signals are provided to 24 pixel-rows arranged in sequence, each display phase includes three display periods as shown in the embodiment of FIG. 15. That is, after the three display periods are completed, the touch detection is executed once.

In another embodiment, N=7*p, p is a positive integer; and the display phase includes p display periods. That is, in one display phase, the driving signals are provided to an integral multiple of 7 driving signal wires in one display phase, so as to control to provide driving signals to an integral multiple of 7 pixel-rows that are sequentially arranged. That is, each time after an integral multiple of 7 pixel-rows are displayed, the display panel is driven to execute the touch detection once.

Figure 16:
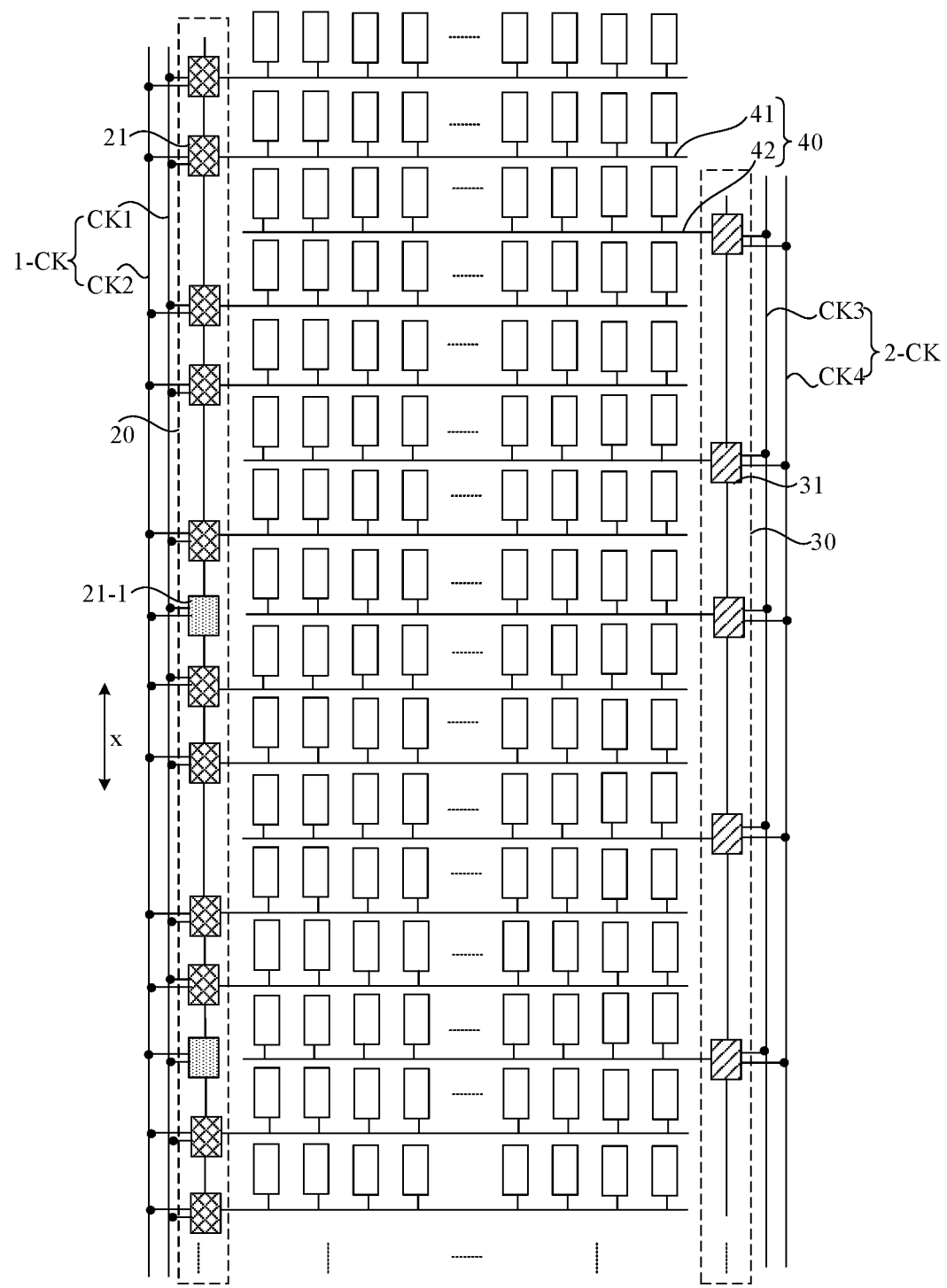
FIG. 16 is a schematic top diagram of a display panel according to another embodiment of the present disclosure.
Figure 17:
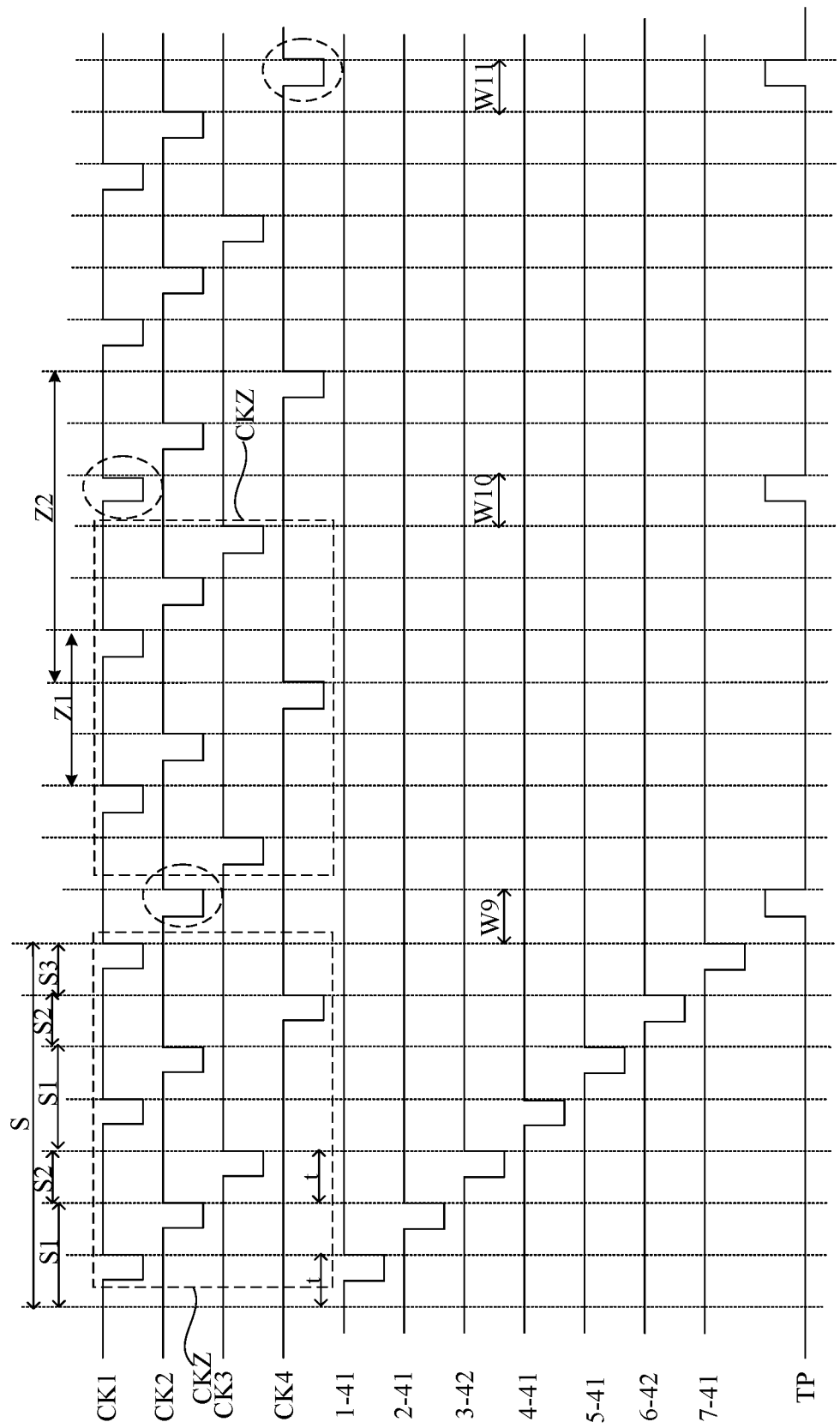
FIG. 17 is a driving timing sequence diagram of the display panel provided by the embodiment of FIG. 16.

FIG. 16 is a schematic top diagram of a display panel according to another embodiment of the present disclosure, and FIG. 17 is a driving timing sequence diagram of the display panel provided in the embodiment of FIG. 16.

As shown in FIG. 16, multiple first shift registers 21 in cascade includes a dummy first shift register 21-1. An output terminal of the dummy first shift register 21-1 is connected to an input terminal of the next stage of first shift register 21, and the output terminal of the dummy first shift register 21-1 is not connected with the first driving signal wire 41. Multiple second shift registers 31 in cascade include a dummy second shift register (not shown in FIG. 16). An output terminal of the dummy second shift register is connected to an input terminal of the next stage of second shift register 31, and the output terminal of the dummy second shift register is not connected with the second driving signal wire 42. According to the description in the above embodiment, it can be understood that in the timing sequence diagram of the clock signal, one effective clock signal (a low-level signal) corresponds to a driving signal output by an output terminal of one stage of shift register. As shown in the drawing, for positions corresponding to the clock signals circled by dotted lines, a position circled by a first dotted line corresponds to controlling the sixth stage of first shift register to output the driving signal, a position circled by a second dotted line corresponds to controlling the eleventh stage of first shift register to output the driving signal, and a position circled by a third dotted line corresponds to controlling the eighth stage of second shift register to output the driving signal. Thus, the sixth stage of first shift register, the eleventh stage of first shift register, and the eighth stage of second shift register are all dummy shift registers, which are only used to transmit and shift signal but not connected to the driving signal wire. In practice, which stage of first shift register (or the second shift register) is set as a dummy shift register can be determined according to the manner of the time division execution of display and touch. It should be ensured that the shift register, which has an output moment of the driving signal output at the output terminal thereof overlapping with the moment of touch, is set as a dummy shift register.

As shown in FIG. 17, a time length to provide the driving signal to each pixel-row is t. The second period length Z2 is greater than the first period length Z1. The second period length is 6*t, and the first period length is 3*t. FIG. 17 shows the timing sequence of the driving signals transmitted on the 7 driving signal wires arranged in sequence in the first display period S. The 7 driving signal wires are 1-41, 2-41, 3-42, 4-41, 5-41, 6-42 and 7-41. Part of the display periods also includes a third sub-phase S3. Taking the first display period S illustrated in the timing sequence diagram as an example, the clock signal group CKZ that drives the first display period includes 7 effective clock signals. The first clock signal wire pair 1-CK provides 5 effective clock signals, and the second clock signal wire pair 2-CK provides 2 effective clock signals. The first display period S includes a first sub-phase S1, a second sub-phase S2, and a third sub-phase S3. In the third sub-phase S3, the effective clock signal provided by the first clock signal wire pair 1-CK controls the first shift register 21 to provide the driving signal to the first driving signal wire 41.

In this embodiment, the dummy shift register is provided, and the dummy shift register is only used to transmit and shift signals and is not connected to the driving signal wire. As shown in FIG. 17, the moments W9\W10\W11 are the moments when the output terminal of the dummy shift register outputs the driving signals. By configuring the dummy shift register not to be connected to the driving signal wire, these moments can be used for touch detection, to realize time division execution of the display and touch. The timing sequence of the first clock signal wire pair and the timing sequence of the second clock signal wire pair illustrated in the embodiment of FIG. 17 can be applied to an embodiment where the touch detection is controlled to be executed once each time after the driving signals are provided to an integral multiple of 7 pixel-rows arranged in sequence.

In some embodiments, the second period length is greater than or equal to the first period length. In the first sub-phase, the effective clock signal provided by the first clock signal wire pair controls the two cascaded first shift registers to provide driving signals to two adjacent first driving signal wires respectively. In the second sub-phase, the effective clock signal provided by the second clock signal wire pair controls the two cascaded second shift registers to provide driving signals to two adjacent second driving signal wires respectively. In this embodiment, through coordination of the clock signals transmitted by the first clock signal wire pair and the second clock signal wire pair, the first driving circuit and the second driving circuit alternately provide driving signals to the corresponding driving signal wires in the display phase, to realize that the N driving signal wires are controlled to provide driving signals to the N pixel-rows arranged in sequence in the display phase, so as to realize the time division execution of display and touch.

In one embodiment, N=4*p, p is a positive integer; and the display phase includes p display periods. That is, the driving signals are provided to an integral multiple of 4 driving signal wires in one display phase, thereby controlling to provide driving signals to an integral multiple of 4 pixel-rows arranged in sequence. Thus, the display panel is driven to execute touch detection once each time after an integral multiple of 4 pixel-rows are displayed.

Figure 18:
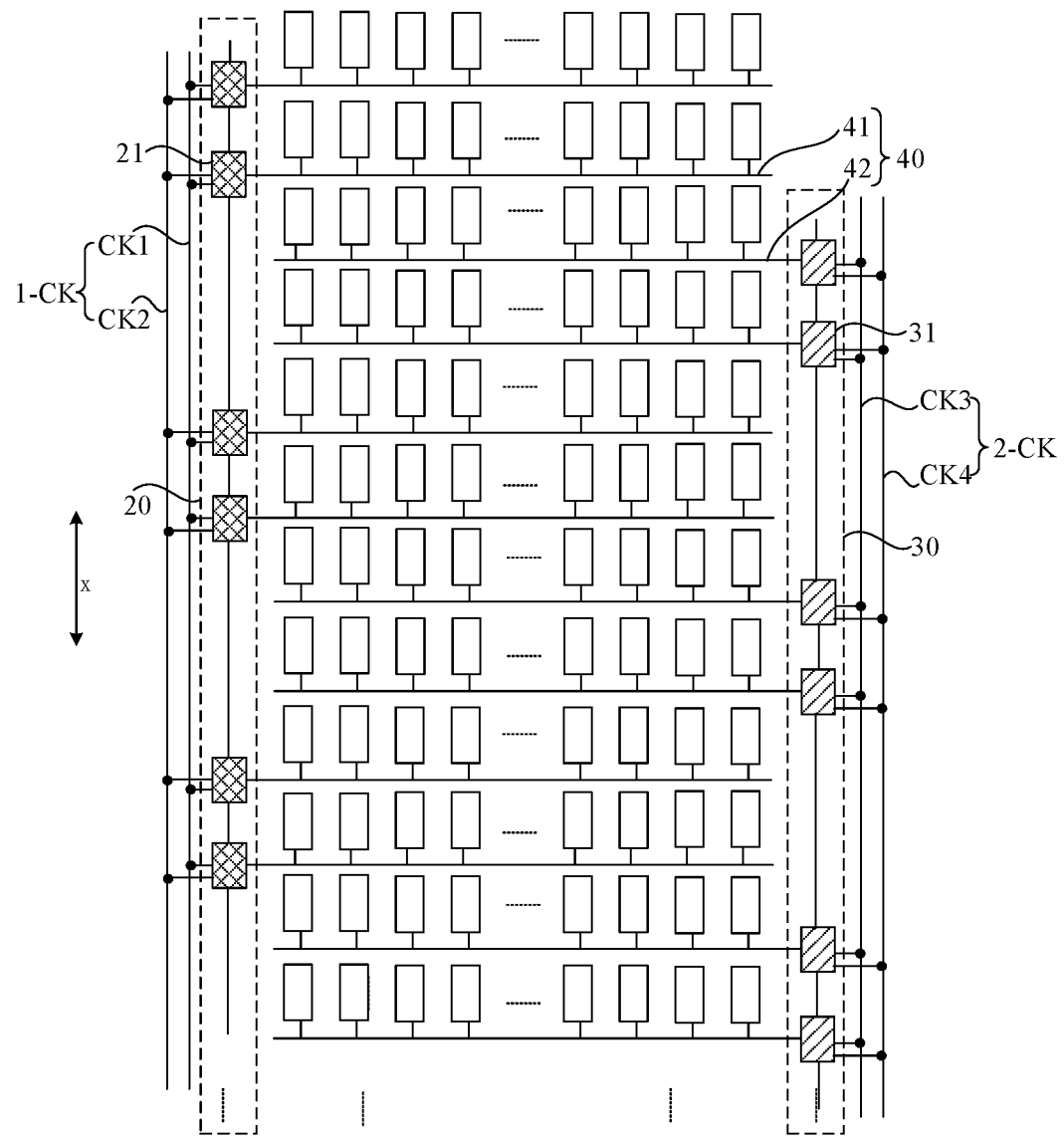
FIG. 18 is a schematic top diagram of a display panel according to another embodiment of the present disclosure.
Figure 19:
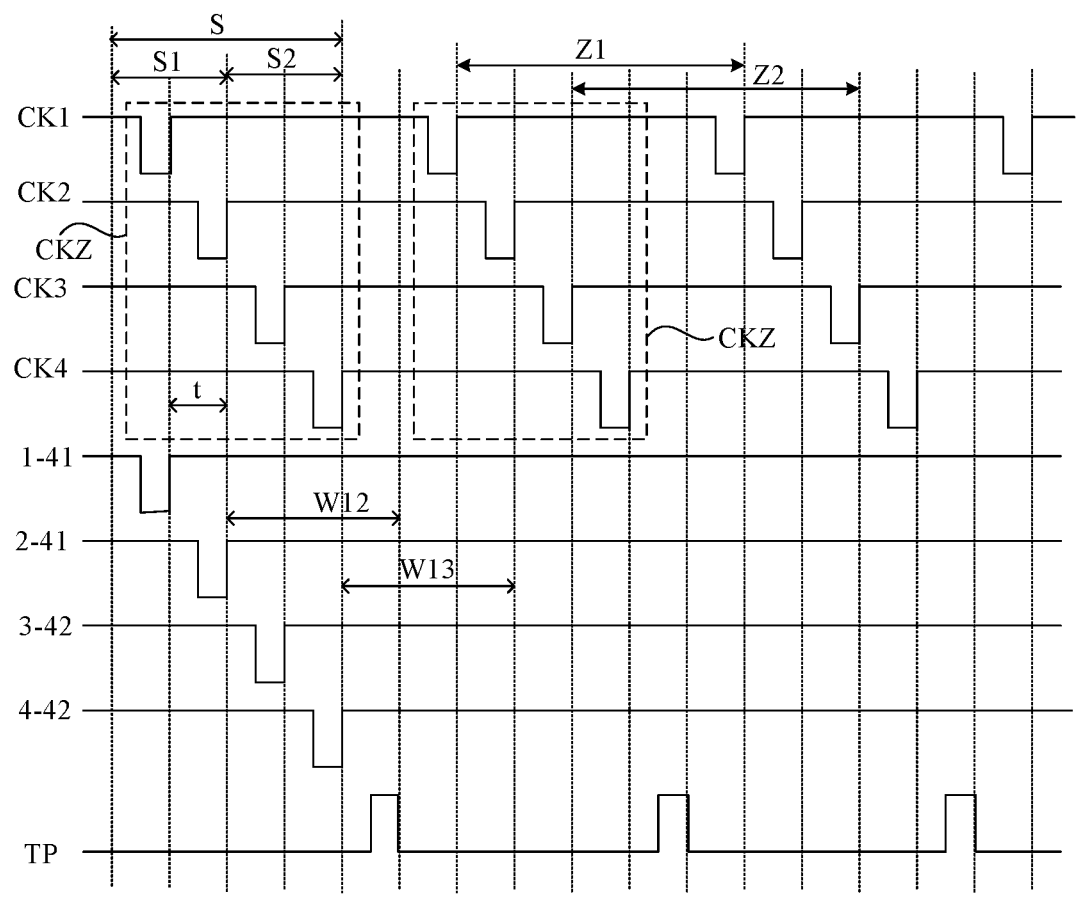
FIG. 19 is a driving timing sequence diagram of the display panel provided of FIG. 18.

Specifically, FIG. 18 is a schematic top diagram of a display panel provided by another embodiment of the present disclosure, and FIG. 19 is a driving timing sequence diagram of the display panel provided in the embodiment of FIG. 18.

According to FIG. 18, two first driving signal wires 41 and two second driving signal wires 42 are alternately arranged in the first direction x. The first driving signal wire 41 is electrically connected to the first shift register 21, and the second driving signal wire 42 is electrically connected to the second shift register 31. The driving method of the display panel can be understood with reference to the timing sequence diagram shown in FIG. 19. The timing sequence diagram of FIG. 19 shows that the second period length Z2 of the clock signal provided to the second clock signal wire pair 2-CK is equal to the first period length Z1 of the clock signal provided to the first clock signal wire pair 1-CK. A time length by which the driving signal wire provides the driving signal to each pixel-row is t. The second period length is 5*t, and the first period length is 5*t. In this embodiment, the display period S includes one first sub-phase S1 and one second sub-phase S2. One clock signal group CKZ includes 4 effective clock signals. The first clock signal wire pair 1-CK provides 2 effective clock signals, and the second clock signal wire pair 2-CK provides 2 effective clock signals. One clock signal group CKZ controls 4 driving signal wires to provide driving signals to 4 pixel-rows arranged in sequence. In the embodiment of FIG. 19, a case where one display phase includes one display period S is taken for illustration. After one first sub-phase S1 and one second sub-phase S2 are completed in sequence in the display phase, the display panel executes the touch phase. In this embodiment, one display period is in a driving mode of "2+2". The driving mode of "2+2" is understood as: the first driving circuit driving two pixel-rows+the second driving circuit driving two pixel-rows. The first driving circuit and the second driving circuit alternately drive to complete one display period.

FIG. 19 shows driving signals transmitted on 4 driving signal wires 1-41, 2-41, 3-42, 4-42 arranged in sequence in the first direction x. The driving signal wires 1-41 and 2-41 are first driving signal wires, and the driving signal wires 3-42 and 4-42 are second driving signal wires. In the first sub-phase S1, the effective clock signal provided by the first clock signal wire pair 1-CK controls the two cascaded first shift registers 21 to respectively provide driving signals to the two adjacent first driving signal wires (1-41 and 2-41).

In the second sub-phase S2, the effective clock signal provided by the second clock signal wire pair 2-CK controls two cascaded second shift register 31 to provide driving signals to the two second driving signal wires (3-42 and 4-42). Therefore, 4 driving signal wires are controlled to provide driving signals to the 4 pixel-rows arranged in sequence in one display phase. By designing the first period length and the second period length and combining with the connection mode of the driving signal wire and the driving circuit in the display panel, a relatively large time interval (the time interval W12 shown in FIG. 19) between the driving signals output by some adjacent stages of first shift registers under the control can be realized. In addition, there is a relatively large time interval (the time interval W13 shown in FIG. 19) between the driving signals output by some adjacent stages of second shift registers under the control. Therefore, the first driving circuit and the second driving circuit can alternately provide driving signals to the corresponding driving signal wires, and the touch detection can be performed at a time period in which the time interval W12 overlaps with the time interval W13, thereby realizing time division execution of display and touch. In this embodiment, it can be realized that each time after the driving signals are provided to 4 pixel-rows arranged in sequence, the touch detection is controlled to be executed once.

In addition, the timing sequence of the first clock signal wire pair and the timing sequence of the second clock signal wire pair illustrated in the embodiment of FIG. 19 can also be applied to an embodiment where the touch detection is controlled to be executed once each time after the driving signals are provided to an integral multiple of 4 pixel-rows arranged in sequence. For example, in an embodiment where the touch detection is controlled to be executed once each time after the driving signals are provided to 8 pixel-rows arranged in sequence, each display phase includes two display periods as shown in the embodiment of FIG. 19. That is, after the two display periods are completed, the touch detection is executed once.

In another embodiment, N=6*p, p is a positive integer; and the display phase includes p display periods. That is, in one display phase, the driving signals are provided to an integral multiple of 6 driving signal wires, so as to control to provide driving signals to an integral multiple of 6 pixel-rows that are sequentially arranged. Thus, each time after an integral multiple of 6 pixel-rows are displayed, the touch detection is executed once.

Figure 20:
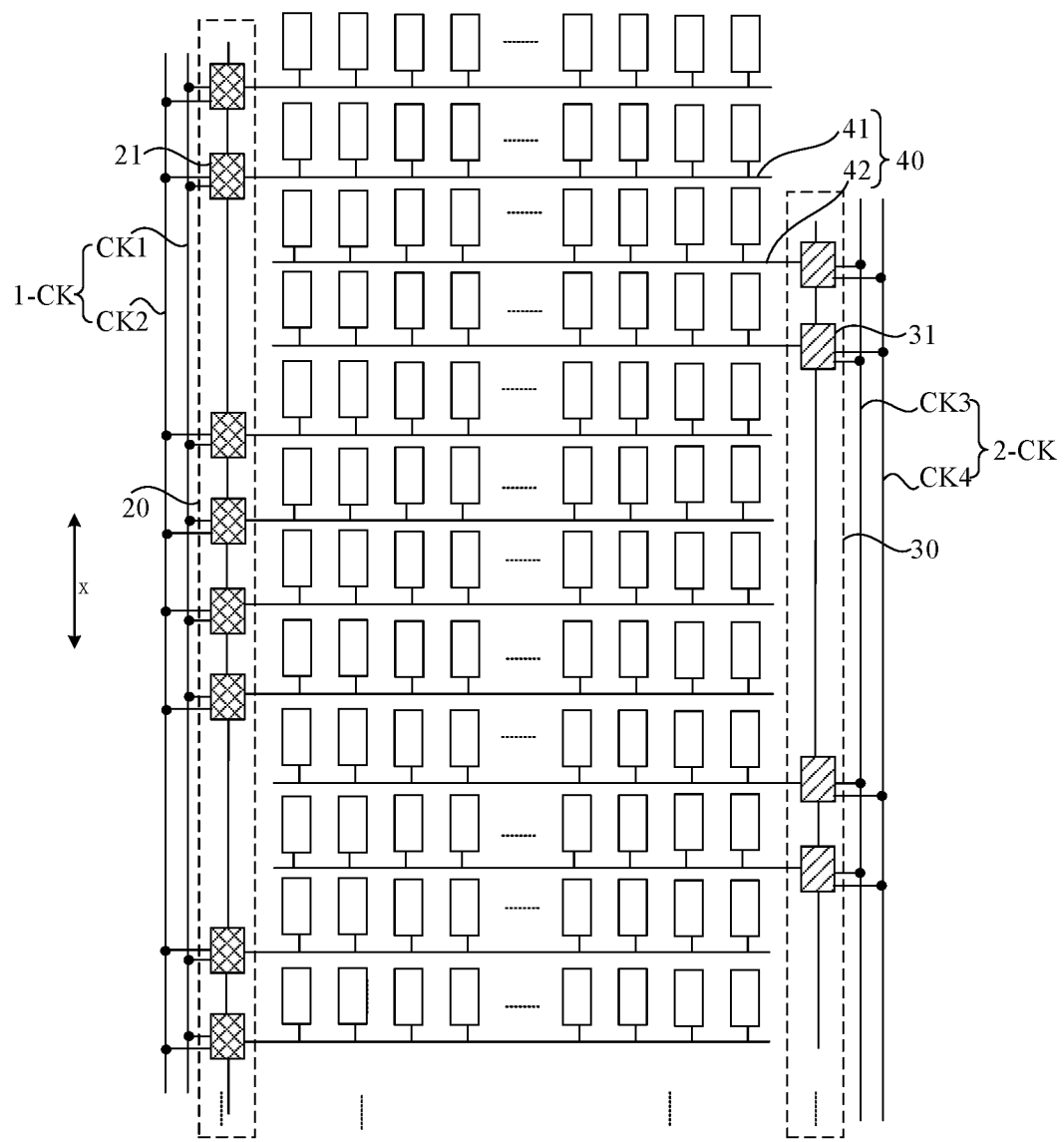
FIG. 20 is a schematic top diagram of a display panel according to another embodiment of the present disclosure.
Figure 21:
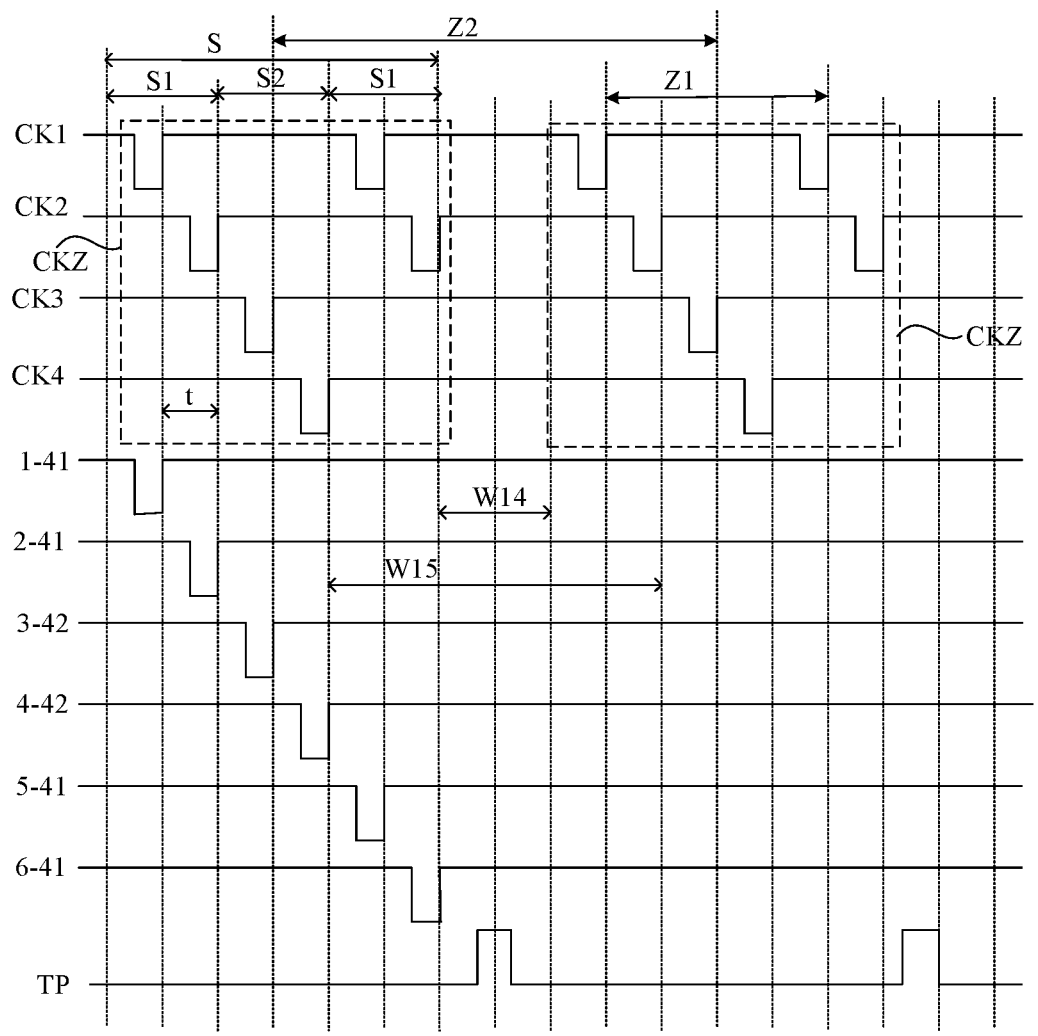
FIG. 21 is a driving timing sequence diagram of the display panel provided by the embodiment of FIG. 20.

Specifically, FIG. 20 is a schematic top diagram of a display panel provided by another embodiment of the present disclosure, and FIG. 21 is a driving timing sequence diagram of the display panel provided in the embodiment of FIG. 20.

FIG. 20 illustrates a connection manner of the driving signal wire and the driving circuit, and the driving method of the display panel can be understood in conjunction with the timing sequence diagram of FIG. 21. The timing sequence diagram of FIG. 21 shows that the second period length Z2 of the clock signal provided to the second clock signal wire pair 2-CK is greater than the first period length Z1 of the clock signal provided to the first clock signal wire pair 1-CK. A time length by which the driving signal wire provides a driving signal to each pixel-row is t. The second period length is 8*t, and the first period length is 4*t. In this embodiment, the display period S includes two first sub-phases S1 and one second sub-phase S2. One clock signal group CKZ includes 6 effective clock signals. The first clock signal wire pair 1-CK provides 4 effective clock signals, and the second clock signal wire pair 2-CK provides 2 effective clock signals. One clock signal group CKZ controls 6 driving signal wires to provide driving signals to the 6 pixel-rows arranged in sequence. In the embodiment of FIG. 21, a case where one display phase includes one display period S is taken for illustration. After one first sub-phase S1, one second sub-phase S2, and one first sub-phase S1 are completed in sequence in the display phase, the display panel executes the touch phase. In this embodiment, one display period is in a driving mode of "2+2+2". The driving mode of "2+2+2" is understood as: the first driving circuit driving two pixel-rows+the second driving circuit driving two pixel-rows+the first driving circuit driving two pixel-rows. The first driving circuit and the second driving circuit alternately drive to complete one display period.

FIG. 21 shows driving signals transmitted on 6 driving signal wires 1-41, 2-41, 3-42, 4-42, 5-41, 6-41 arranged in sequence in the first direction x. The driving signal wires 1-41, 2-41, 5-41 and 6-41 are all first driving signal wires, and the driving signal wires 3-42 and 4-42 are both second driving signal wires. In the first one of first sub-phases S1, an effective clock signal provided by the first clock signal wire pair 1-CK controls the two cascaded first shift registers 21 to provide driving signals to the two adjacent first driving signal wires (1-41 and 2-41) respectively. In the second sub-phase S2, an effective clock signal provided by the second clock signal wire pair 2-CK controls two cascaded second shift register 31 to provide driving signals to the two second driving signal wires (3-42 and 4-42). In the second one of first sub-phases S1, an effective clock signal provided by the first clock signal wire pair 1-CK controls the two cascaded first shift registers 21 to provide driving signals to the two adjacent first driving signal wires (5-41 and 6-41) respectively. Therefore, 6 driving signal wires are controlled to provide driving signals to the 6 pixel-rows arranged in sequence in one display phase. By designing the first period length and the second period length and combining with the connection mode of the driving signal wire and the driving circuit in the display panel, a relatively large time interval (the time interval W14 shown in FIG. 21) between the driving signals output by some adjacent stages of first shift registers under the control can be realized. In addition, there is a relatively large time interval (the time interval W15 shown in FIG. 21) between the driving signals output by some adjacent stages of second shift registers under the control. Therefore, the first driving circuit and the second driving circuit can alternately provide driving signals to the corresponding driving signal wires. In addition, the touch detection may be performed at a time period in which the time interval W14 overlaps with the time interval W15, thereby realizing time division execution of display and touch. In this embodiment, it can be realized that each time after the driving signals are provided to 6 pixel-rows arranged in sequence, the touch detection is controlled to be executed once.

In addition, the timing sequence of the first clock signal wire pair and the timing sequence of the second clock signal wire pair illustrated in the embodiment of FIG. 21 can also be applied to an embodiment where the touch detection is controlled to be executed once each time after the driving signals are provided to an integral multiple of 6 pixel-rows arranged in sequence. For example, in an embodiment where the touch detection is controlled to be executed once each time after driving signals are provided to 12 pixel-rows arranged in sequence, each display phase includes two display periods as shown in the embodiment of FIG. 21. That is, after the two display periods are completed, the touch detection is executed once.

Specifically, the step of controlling the display panel to execute the touch phase between two adjacent display phases includes: controlling a time length for executing the touch phase by the display panel to be t or 2*t. As shown in the timing sequence diagram in FIG. 21, clock signals with a regular period are provided to the first clock signal pair in order to control the operation of the first driving circuit, and clock signals with a regular period are provided to the second clock signal pair in order to control the operation of the second driving circuit. It is realized that the touch detection is executed once each time after the driving signals are provided to 6 pixel-rows, through the coordination of the clock signals transmitted by the first clock signal wire pair and the clock signals transmitted by the second clock signal wire pair. A time length of the touch phase is a time length t for providing the driving signal to each pixel-row, or double t. In this embodiment, the time of each touch phase can be increased.

With reference to the timing sequence diagrams in the above-mentioned embodiments of FIG. 11, FIG. 13, FIG. 15, FIG. 17 and FIG. 19, a time length for providing a driving signal to each pixel-row is t, and a time length for controlling the display panel to execute the touch phase is t. That is, the time length of the touch phase is equal to the time length for providing the driving signal to each pixel-row. In the embodiment of the present disclosure, the operation of the driving circuit can be controlled by providing clock signals with a regular period to the first clock signal wire pair and the second clock signal wire pair respectively, thereby realizing time division execution of the display and touch. Moreover, it can be ensured that under a satisfaction of the above conditions, when one frame of picture is displayed, the time required to provide driving signals to the N pixel-rows in the display panel is the shortest, which reduces the impact on the display refresh rate.

Continuing to refer to the schematic diagram in FIG. 2, the display panel provided by the embodiment of the present disclosure includes a display area AA and a non-display area BA. M pixel-rows 10 are located in the display area AA. The first driving circuit 20 and the second driving circuit 30 are located in the non-display area BA. In the second direction y, the first driving circuit 20 and the second driving circuit 30 are respectively located on both sides of the display area AA, where the second direction y and the first direction x intersect. Space in the non-display area is reasonable used by providing driving circuits separately on both sides of the display area, to avoid a wider border on one side of the display panel.

In another embodiment, the first driving circuit and the second driving circuit are located on the same side of the display area. In practice, positions of the first driving circuit and the second driving circuit can be set according to specific design requirements.

Figure 22:
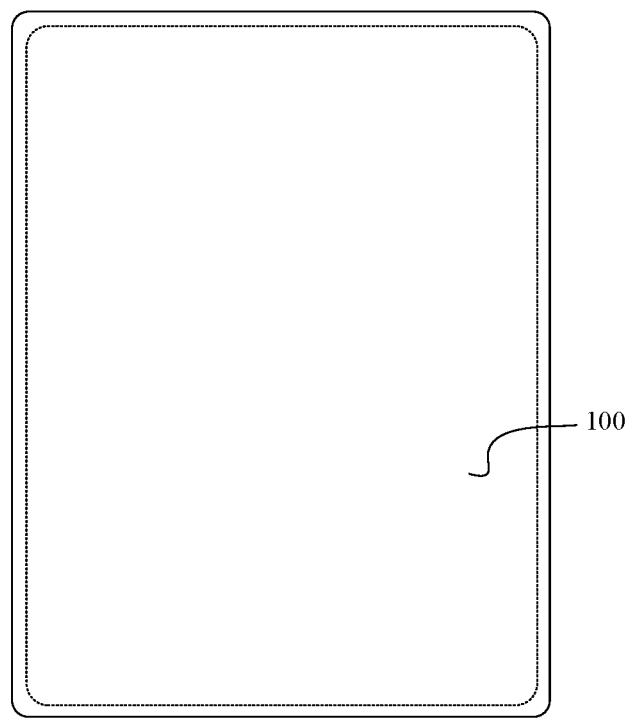
FIG. 22 is a schematic diagram of a display device according to an embodiment of the present disclosure.

A display device is provided according to an embodiment of the present disclosure. FIG. 22 is a schematic diagram of the display device according to an embodiment of the present disclosure. As shown in FIG. 22, the display device includes the display panel 100 provided by any embodiment of the present disclosure. The structure of the display panel has been described in the above embodiments and will not be repeated here. The display device in the embodiment of the present disclosure may be any device having a display function, such as a mobile phone, a tablet computer, a notebook computer, an electronic paper book, a television, and a smart wearable product.

The above are only preferred embodiments of the present disclosure and are not intended to limit the present disclosure. Any modification, equivalent replacement, improvement, etc. made within the spirit and principle of the present disclosure should be included in the scope of protection of the present disclosure.

Finally, it should be noted that the various embodiments above are only used to illustrate the technical solution of the present disclosure, rather than limiting; although the present disclosure has been described in detail with reference to the various embodiments above, those of ordinary skill in the art should understand that: they can still modify the technical solutions described in the various embodiments above or equivalently replace some or all of the technical features; while these modifications or replacements do not cause the essence of the corresponding technical solutions to depart from the scope of the technical solutions of the various embodiments of the present disclosure.

What is claimed is:

1. A driving method of a display panel, wherein the display panel comprises:
    M pixel-rows arranged in a first direction, wherein M is a positive integer;
    a first driving circuit and a second driving circuit, wherein the first driving circuit comprises a plurality of first shift registers in cascade, and the second driving circuit comprises a plurality of second shift registers in cascade;
    M driving signal wires, wherein each one of the M driving signal wires drives a respective one of the M pixel-rows, the M driving signal wires comprise m first driving signal wires and n second driving signal wires, wherein m and n are both positive integers, and m+n=M; the first driving signal wires are electrically connected to output terminals of respective first shift registers, and the second driving signal wires are electrically connected to output terminals of respective second shift registers;
    a first clock signal wire pair and a second clock signal wire pair, wherein the first clock signal wire pair and the second clock signal wire pair each comprise two clock signal wires, the first clock signal wire pair is configured to control an operation of the first driving circuit, and the second clock signal wire pair is configured to control an operation of the second driving circuit; and
    a plurality of touch electrodes configured to transmit touch signals in a touch phase, and
    wherein the driving method comprises:
    providing a first clock signal with a first period length to the first clock signal wire pair, to control the operation of the first driving circuit;
    providing a second clock signal with a second period length to the second clock signal wire pair, to control the operation of the second driving circuit, wherein each of the first period length and the second period length is composed of widths of one high-level signal and one low-level signal that are adjacent and continuous; and
    controlling the display panel to execute the touch phase between adjacent display phases; wherein in the display phase, one clock signal group controls N driving signal wires to provide driving signals to N pixel-rows arranged in sequence, wherein N is a positive integer and N≥3; the N driving signal wires comprise a first driving signal wire connected to the first shift register and a second driving signal wire connected to the second shift register, and the clock signal group comprises N effective clock signals provided jointly by the first clock signal wire pair and the second clock signal wire pair.

2. The driving method according to claim 1, wherein
    the display phase comprises at least one display period, the display period comprises at least one first sub-phase and at least one second sub-phase, and one first sub-phase and one second sub-phase are executed alternately; and
    in the display phase, one clock signal group controlling N driving signal wires to provide driving signals to N pixel-rows arranged in sequence, comprises: in the first sub-phase, controlling the first driving signal wire to provide a driving signal to a respective pixel-row by an effective clock signal provided by the first clock signal wire pair; and in the second sub-phase, controlling the second driving signal wire to provide a driving signal to a respective pixel-row by an effective clock signal provided by the second clock signal wire pair.

3. The driving method according to claim 2, wherein
    the second period length is greater than the first period length;
    in the first sub-phase, controlling the first driving signal wire to provide the driving signal to a respective pixel-row by the effective clock signal provided by the first clock signal wire pair, comprises: controlling two first shift registers in cascade to provide the driving signals to two adjacent first driving signal wires respectively, by the effective clock signal provided by the first clock signal wire pair; and
    in the second sub-phase, controlling the second driving signal wire to provide the driving signal to a respective pixel-row by the effective clock signal provided by the second clock signal wire pair comprises: controlling one of the second shift registers to provide the driving signal to one of the second driving signal wires, by the effective clock signal provided by the second clock signal wire pair.

4. The driving method according to claim 3, wherein
    N=3*p, wherein p is a positive integer; and the display phase comprises p display periods;
    a time length for providing one of the driving signals to a respective pixel-row is t;
    the second period length is 8*t, and the first period length is 4*t; and
    the display period comprises one first sub-phase and one second sub-phase.

5. The driving method according to claim 3, wherein
    N=5*p, wherein p is a positive integer; and the display phase comprises p display periods;
    a time length for providing one of the driving signals to a respective pixel-row is t;
    the second period length is 12*t, and the first period length is 3*t; and
    the display period comprises two first sub-phases and one second sub-phase.

6. The driving method according to claim 3, wherein
    N=8*p, wherein p is a positive integer; and the display phase comprises p display periods;
    a time length for providing one of the driving signals to a respective pixel-row is t;
    the second period length is 9*t, and the first period length is 3*t; and
    the display period comprises three first sub-phases and two second sub-phases.

7. The driving method according to claim 3, wherein
the plurality of first shift registers in cascade comprise a dummy first shift register, an output terminal of the dummy first shift register is connected to an input terminal of a next stage of the first shift register, and the output terminal of the dummy first shift register is not connected to the first driving signal wire; and the plurality of second shift registers in cascade comprise a dummy second shift register, an output terminal of the dummy second shift register is connected to an input terminal of a next stage of the second shift register, and the output terminal of the dummy second shift register is not connected to the second driving signal wire;
N=7*p, wherein p is a positive integer; and the display phase comprises p display periods;
a time length for providing one of the driving signals to a respective pixel-row is t;
the second period length is 6*t, and the first period length is 3*t; and
a part of the display periods further comprises a third sub-phase; and in the third sub-phase of the display period, an effective clock signal provided by the first clock signal wire pair controls the first shift register to provide a driving signal to the first driving signal wire.

8. The driving method according to claim 2, wherein
the second period length is greater than or equal to the first period length;
in the first sub-phase, controlling the first driving signal wire to provide the driving signal to a respective pixel-row by the effective clock signal provided by the first clock signal wire pair, comprises: controlling two first shift registers in cascade to provide the driving signals to two adjacent first driving signal wires respectively, by the effective clock signal provided by the first clock signal wire pair;
in the second sub-phase, controlling the second driving signal wire to provide the driving signal to a respective pixel-row by the effective clock signal provided by the second clock signal wire pair comprises: controlling two second shift registers in cascade to provide the driving signals to two adjacent second driving signal wires respectively, by the effective clock signal provided by the second clock signal wire pair.

9. The driving method according to claim 8, wherein
N=4*p, wherein p is a positive integer; and the display phase comprises p display periods;
a time length for providing one of the driving signals to a respective pixel-row is t;
the first period length is 5*t, and the second period length is 5*t; and
the display period comprises one first sub-phase and one second sub-phase.

10. The driving method according to claim 8, wherein
N=6*p, wherein p is a positive integer; and the display phase comprises p display periods;
a time length for providing one of the driving signals to a respective pixel-row is t;
the second period length is greater than the first period length, wherein the second period length is 8*t, and the first period length is 4*t; and
the display period comprises two first sub-phases and one second sub-phase.

11. The driving method according to claim 10, wherein a time length for controlling the display panel to execute the touch phase is t or 2*t.

12. The driving method according to claim 1, wherein
a time length for providing one of the driving signals to a respective pixel-row is t; and
a time length for controlling the display panel to execute the touch phase is t.

13. A display panel, wherein the display panel comprises:
M pixel-rows arranged in a first direction, wherein M is a positive integer;
a first driving circuit and a second driving circuit, wherein the first driving circuit comprises a plurality of first shift registers in cascade, and the second driving circuit comprises a plurality of second shift registers in cascade;
M driving signal wires, wherein each one of the M driving signal wires drives a respective one of the M pixel-rows, the M driving signal wires comprise m first driving signal wires and n second driving signal wires, m and n are both positive integers, and m+n=M; the first driving signal wires are electrically connected to output terminals of respective first shift registers, and the second driving signal wires are electrically connected to output terminals of respective second shift registers;
a first clock signal wire pair and a second clock signal wire pair, wherein the first clock signal wire pair and the second clock signal wire pair each comprise two clock signal wires, the first clock signal wire pair is configured to control an operation of the first driving circuit, and the second clock signal wire pair is configured to an control operation of the second driving circuit;
a plurality of touch electrodes configured to transmit touch signals in a touch phase;
a display driving module configured to
provide a first clock signal with a first period length to the first clock signal wire pair, to control the operation of the first driving circuit; provide a second clock signal with a second period length to the second clock signal wire pair, to control the operation of the second driving circuit; wherein each of the first period length and the second period length is composed of widths of one high-level signal and one low-level signal that are adjacent and continuous; and
control the display panel to execute a plurality of display phases; wherein in the display phase, one clock signal group controls N driving signal wires to provide driving signals to N pixel-rows arranged in sequence, wherein N is a positive integer and N≥3;
the N driving signal wires comprise a first driving signal wire connected to the first shift register and a second driving signal wire connected to the second shift register, and the clock signal group comprises N effective clock signals provided jointly by the first clock signal wire pair and the second clock signal wire pair; and
a touch function module configured to control the display panel to execute the touch phase between two adjacent display phases.

14. The display panel according to claim 13, wherein
the second period length is greater than the first period length;
the display phase comprises at least one display period, the display period comprises at least one first sub-phase and at least one second sub-phase, and one first sub-phase and one second sub-phase are executed alternately; and the display driving module is further configured to: in the first sub-phase, control two first shift registers in cascade to respectively provide driving signals to two adjacent first driving signal wires, by an effective clock signal provided by the first clock signal wire pair;

and in the second sub-phase, control the second shift register to provide a driving signal to the second driving signal wire by an effective clock signal provided by the second clock signal wire pair.

15. The display panel according to claim 14, wherein the plurality of the first shift registers in cascade comprise a dummy first shift register, an output terminal of the dummy first shift register is connected to an input terminal of a next stage of the first shift register, and the output terminal of the dummy first shift register is not connected to the first driving signal wire; and the plurality of the second shift registers in cascade comprise a dummy second shift register, an output terminal of the dummy second shift register is connected to an input terminal of a next stage of the second shift register, and the output terminal of the dummy second shift register is not connected to the second driving signal wire.

16. The display panel according to claim 13, wherein the second period length is greater than or equal to the first period length;

the display phase comprises at least one display period, the display period comprises at least one first sub-phase and at least one second sub-phase, and the first sub-phase and the second sub-phase are executed alternately; and the display driving module is further configured to: in the first sub-phase, control two first shift registers in cascade to provide scan driving signals to two adjacent first driving signal wires respectively, by an effective clock signal provided by the first clock signal wire pair; and in the second sub-phase, control two second shift registers in cascade to provide scan driving signals to two adjacent second driving signal wires respectively, by an effective clock signal provided by the second clock signal wire pair.

17. The display panel according to claim 13, wherein the first driving circuit comprises a first gate driving circuit, the second driving circuit comprises a second gate driving circuit, and the driving signal wire comprises a gate scan wire.

18. The display panel according to claim 13, wherein the first driving circuit comprises a first light-emitting driving circuit, the second driving circuit comprises a second light-emitting driving circuit, and the driving signal wire comprises a light-emitting control wire.

19. The display panel according to claim 13, wherein the display panel comprises a display area and a non-display area, the M pixel-rows are located in the display area, and the first driving circuit and the second driving circuit are located in the non-display area; wherein in a second direction, the first driving circuit and the second driving circuit are respectively located at two sides of the display area, and the second direction and the first direction intersect.

20. A display device, comprising a display panel, wherein the display panel comprises:

M pixel-rows arranged in a first direction, wherein M is a positive integer;

a first driving circuit and a second driving circuit, wherein the first driving circuit comprises a plurality of first shift registers in cascade, and the second driving circuit comprises a plurality of second shift registers in cascade;

M driving signal wires, wherein each one of the driving signal wires drives a respective one of the M pixel-rows, the M driving signal wires comprise m first driving signal wires and n second driving signal wires, m and n are both positive integers, and m+n=M; and the first driving signal wires are electrically connected to output terminals of respective first shift registers, and the second driving signal wires are electrically connected to output terminals of respective second shift registers;

a first clock signal wire pair and a second clock signal wire pair, wherein the first clock signal wire pair and the second clock signal wire pair each comprise two clock signal wires, the first clock signal wire pair is configured to control operation of the first driving circuit, and the second clock signal wire pair is configured to control operation of the second driving circuit;

a plurality of touch electrodes configured to transmit touch signals in a touch phase;

a display driving module configured to provide a first clock signal with a first period length to the first clock signal wire pair, to control the operation of the first driving circuit;

provide a second clock signal with a second period length to the second clock signal wire pair, to control the operation of the second driving circuit; wherein each of the first period length and the second period length is composed of widths of one high-level signal and one low-level signal that are adjacent and continuous; and control the display panel to execute a plurality of display phases; wherein in the display phase, one clock signal group controls N driving signal wires to provide driving signals to N pixel-rows arranged in sequence, wherein N is a positive integer and N≥3; and the N driving signal wires comprises a first driving signal wire connected to the first shift register and a second driving signal wire connected to the second shift register, and the clock signal group comprises N effective clock signals provided jointly by the first clock signal wire pair and the second clock signal wire pair; and a touch function module configured to control the display panel to execute a touch phase between two adjacent display phases.

* * * * *